(12) United States Patent
Lai et al.

(10) Patent No.: US 8,291,155 B2
(45) Date of Patent: Oct. 16, 2012

(54) DATA ACCESS METHOD, MEMORY CONTROLLER AND MEMORY STORAGE SYSTEM

(75) Inventors: Ming-Fu Lai, Miaoli (TW); Ying-Fu Chao, Miaoli (TW); Kheng-Chong Tan, Miaoli (TW)

(73) Assignee: Phison Electronics Corp., Miaoli (TW)

( * ) Notice: Subject to any disclaimer, the term of this patent is extended or adjusted under 35 U.S.C. 154(b) by 275 days.

(21) Appl. No.: 12/773,475

(22) Filed: May 4, 2010

(65) Prior Publication Data

US 2011/0231597 A1   Sep. 22, 2011

(30) Foreign Application Priority Data

Mar. 17, 2010 (TW) .............................. 99107928 A

(51) Int. Cl.
G06F 13/00 (2006.01)
G06F 13/28 (2006.01)
G06F 12/00 (2006.01)
G06F 17/30 (2006.01)

(52) U.S. Cl. . 711/103; 711/154; 711/202; 711/E12.002; 707/822; 707/828

(58) Field of Classification Search .................. 711/103, 711/154, 202, E12.002; 707/822, 828
See application file for complete search history.

(56) References Cited

U.S. PATENT DOCUMENTS

2009/0172321 A1 * 7/2009 Scheuerlein et al. ......... 711/161
2010/0153672 A1 * 6/2010 Jogand-Coulomb et al. . 711/164

* cited by examiner

*Primary Examiner* — Edward Dudek, Jr.
(74) *Attorney, Agent, or Firm* — J.C. Patents

(57) ABSTRACT

A data access method for accessing a non-volatile memory module is provided. The data access method includes configuring a plurality of logical addresses and grouping the logical addresses into logical blocks to map to the physical blocks of the non-volatile memory module, and a host system formats the logical addresses into one partition by using a file system and the partition stores at least one file and a file description block corresponding to the file. The data access method further includes searching an end mark corresponding to entry values of the file description block, setting logical addresses storing the end mark as default pattern addresses, and setting values stored in the logical addresses as default values corresponding to the default pattern addresses. Accordingly, the data access method can divide one partition into a write protect area and a writable area by updating data stored in the default pattern addresses.

28 Claims, 15 Drawing Sheets

| | |
|---|---|
| 600(0) | FFFFFFFh |
| 600(1) | 600(2) |
| 600(2) | 600(3) |
| 600(3) | FFFFFFFh |
| 600(4) | FFFFFFFh |
| 600(5) | 0000000h |
| ⋮ | ⋮ |
| 600(W) | 0000000h |

1002a → top-left, 1002b → top-right

| | |
|---|---|
| f1.exe | 600(1) |
| f2.dll | 600(4) |

1004a → left, 1004b → right

DATA ACCESS METHOD, MEMORY CONTROLLER AND MEMORY STORAGE SYSTEM

CROSS-REFERENCE TO RELATED APPLICATION

This application claims the priority benefit of Taiwan application serial no. 99107928, filed on Mar. 17, 2010. The entirety of the above-mentioned patent application is hereby incorporated by reference herein and made a part of this specification.

BACKGROUND

1. Technology Field

The present invention relates to a data access method, a memory controller and a memory storage system and particularly to a data access method capable of configuring a write-protect area and a writable area in one partition, and a memory controller and a memory storage system using the method.

2. Description of Related Art

Digital cameras, cells phones, and digital music players have undergone rapid growth in recent years, so that consumer demand for storage media has also rapid increased. Rewritable non-volatile memory is one of the most adaptable memories for such battery-powered portable products due to its characteristics such as data non-volatility, low power consumption, small volume, and non-mechanical structure. A memory card is a storage device adopting NAND flash memory as storage medium. A memory card has been broadly used for storing important personal data thanks to its small volume and large capacity.

Because the capacity of flash memory becomes much larger than before, a user usually formats the available storage spaces of a storage device adopting flash memory as storage medium into a plurality of partitions by a file system for using respectively. For example, some important data is stored in one of the formatted partitions and this partition is set as a write-protect area, thereby preventing the important data from being mistakenly deleted. However, according to the standard of a memory card (e.g., a secure digital (SD) memory card and a multi media card (MMC), etc.), the memory card can not support the function for a plurality of partitions. Namely, the storage spaces of the memory card can not be formatted into a plurality of partitions for accessing by a host system. Accordingly, the storage spaces of the memory card only are formatted into one partition and are set as the writable area or the write-protect area in unit of the entire partition.

Therefore, a user often needs to set a memory card, which only stores a little of data, as being at a write-protect mode, and thereby unused storage spaces of the memory card will be wasted. For example, when a manufacturer producing navigation machines applies a memory card having 16 gigabytes (GB) of storage spaces, as storage medium for storing navigation software and map information of 2 GB of data size, the memory card is set as being the write-protect mode with only storing 2 GB of data volume in order to prevent the navigation software and map information from being deleted mistakenly by a user. Accordingly, unused storage spaces of the memory card will not be used any more.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data access method capable of setting a portion of storage addresses of one partition as a write-protect area, setting another portion of the storage addresses as a writable area, and adding directories or files in the writable area.

The present invention is directed to a memory controller capable of setting a portion of storage addresses of one partition of a non-volatile memory module as a write-protect area, setting another portion of the storage addresses as a writable area, and adding directories or files in the writable area.

The present invention is directed to a memory storage system capable of setting a portion of storage addresses of one partition of a non-volatile memory module as a write-protect area, setting another portion of the storage addresses as a writable area, and adding directories or files in the writable area.

According to an exemplary embodiment of the present invention, a data access method for accessing a non-volatile memory module is provided, wherein the non-volatile memory module has a plurality of physical blocks. The data access method includes at least grouping the physical blocks into a data area, a spare area and a system area; configuring a plurality of logical addresses and grouping the logical addresses into a plurality of logical blocks for mapping to the physical blocks of the data area; and using a file system to format the logical addresses into one partition. Herein, the partition has a file and a file description block (FDB) corresponding to the file, and the partition has at least one file allocation table for storing at least one entry value corresponding to logical addresses storing the file description block. The data access method also includes searching an end mark of the entry value according to the file allocation table; setting logical addresses storing the end mark as default pattern addresses; and taking values stored in the logical addresses storing the end mark as default values corresponding to the default pattern addresses.

According to an exemplary embodiment of the present invention, a memory controller including a memory interface, a memory management circuit and a host interface is provided. The memory interface is coupled to the memory management circuit and configured for accessing the above-mentioned memory module. The host interface is coupled to the memory management circuit and configured for coupling to a host system. The memory management circuit is configured for executing the above-mentioned data access method.

According to an exemplary embodiment of the present invention, a memory storage system including a connector, the above-mentioned memory module and a memory controller coupled to the memory module is provided. Herein the memory controller is configured for executing the above-mentioned data access method.

According to an exemplary embodiment of the present invention, the above-mentioned physical blocks has a plurality of physical pages and the physical pages belonging to the same physical block can be written individually and must be erased simultaneously.

According to an exemplary embodiment of the present invention, a non-volatile memory storage system including a connector, a non-volatile memory module and a memory controller is provided. The connector is coupled to a host system. The memory module has a data area, a spare area and a system area, and the data area, the spare area and the system area have a plurality of physical blocks, respectively. The memory controller is coupled to the connector and the non-volatile memory module and configured for configuring a plurality of logical addresses and grouping the logical addresses into a plurality of logical blocks for mapping to the physical blocks of the data area, wherein the logical addresses are formatted into a partition and the partition has a file allocation table area and a directory area. And, the logical addresses includes a write-protect area and a writable area, the file allocation area has at least two entry values corresponding to the directory area, the logical addresses storing one of the at least two entry values belongs to the write-protect area and the logical addresses storing another one of the at least two entry values belongs to the writeable area. Herein, the above-mentioned another one of the at least two entry values corresponds to an end mark of the directory area.

Based on the above, the exemplary embodiments of the present invention are capable of setting a portion of storage addresses as a write-protect area in one partition formatted by a file system, setting another portion of the storage addresses as a writable area, and adding directories or files in the writable area.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10A and FIG. 10B illustrate an example of a file allocation table and a file description block according to the exemplary embodiment of the present invention.

FIG. 10C illustrates an example of a file allocation table area according to the exemplary embodiment of the present invention.

DESCRIPTION OF THE EMBODIMENTS

Figure 1A:
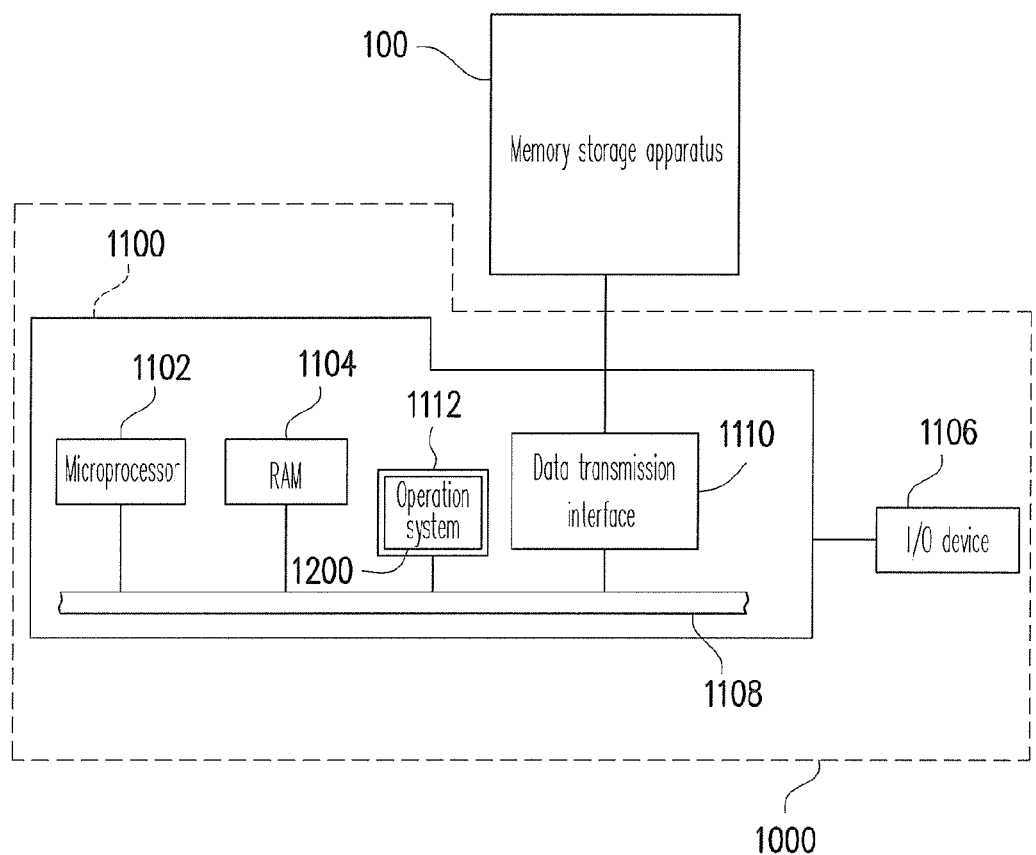
FIG. 1A is a schematic block diagram of a host system using a memory storage apparatus according to the exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A,B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A memory storage apparatus (i.e., a memory storage system), typically, includes a memory chip and a controller (i.e., a control circuit). The memory storage apparatus is usually used together with a host system so that the host system can write data into or read data from the memory storage apparatus. In addition, a memory storage apparatus also includes an embedded memory and a software that can be executed by a host system and substantially served as a controller of the embedded memory.

FIG. 1A is a schematic block diagram of a host system using a memory storage apparatus according to an exemplary embodiment of the present invention.

Figure 1B:
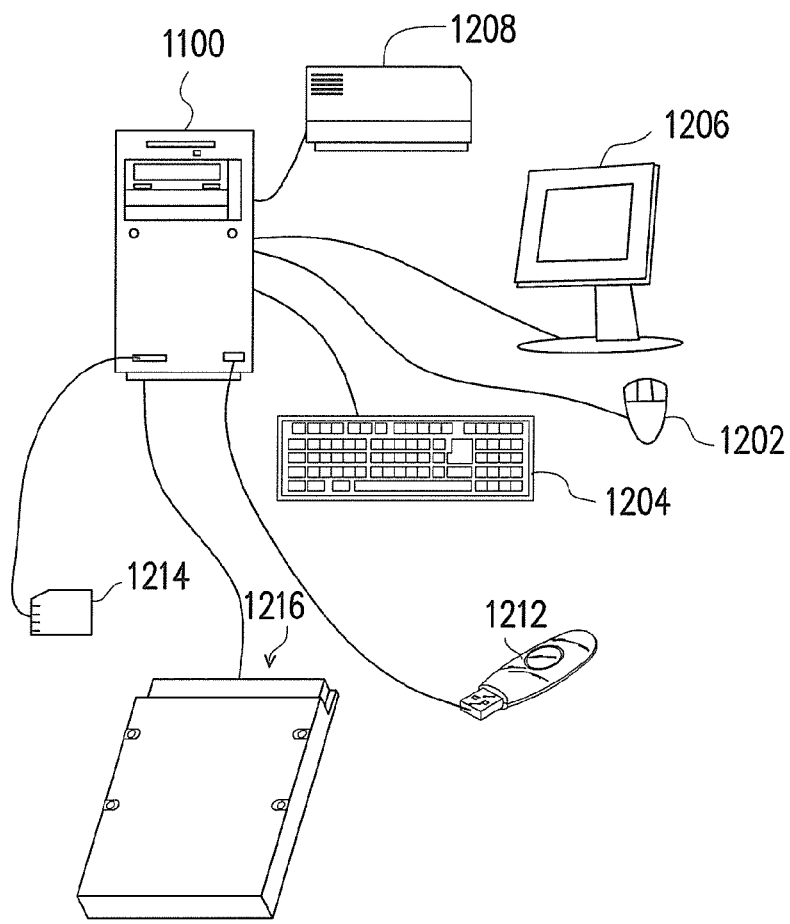
FIG. 1B is a diagram illustrating a computer, an input/output (I/O) device, and a memory storage apparatus according to the exemplary embodiment of the present invention.

Referring to FIG. 1A, a host system 1000 includes a computer 1100 and an input/output (I/O) device 1106. The computer 1100 includes a microprocessor 1102, a random access memory (RAM) 1104, a system bus 1108, a data transmission interface 1110 and a primary storage device 1112. The I/O device 1106 includes a mouse 1202, a keyboard 1204, a display 1206, and a printer 1208 as shown in FIG. 1B. It should be noted that the device in FIG. 1B does not limit the I/O device 1106; the I/O device 1106 may include other devices.

In the exemplary embodiment of the present invention, the memory storage apparatus 100 is coupled to the devices of the host system 1000 through the data transmission interface 1110. The host system 1000 may write data into or read data from the memory storage apparatus 100 through the CPU 1102, the RAM 1104, the I/O device 1106 and an operation system 1200 installed in the primary storage device 1112. For example, the memory storage apparatus 100 may be a non-volatile memory storage apparatus, such as a flash drive 1212, a memory card 1214, or a solid state drive (SSD) 1216 shown in FIG. 1B.

Figure 1C:
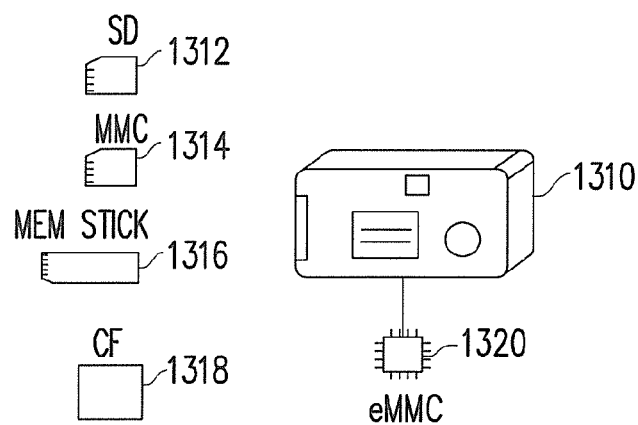
FIG. 1C is a diagram of a host system and a memory storage apparatus according to another exemplary embodiment of the present invention.

Generally, the host system 1000 substantially could be any system capable of storing data. Even though the host system 1000 is described as a computer system in the exemplary embodiment, in another exemplary embodiment of the present invention, the host system 1000 may also be a digital camera, a video camera, a communication device, an audio player, or a video player, and etc. For example, if the host system is a digital camera (video camera) 1310, the memory storage apparatus is then a SD card 1312, a MMC card 1314, a memory stick 1316, a CF card 1318 or an embedded storage device 1320 (as shown in FIG. 1C). The embedded storage device 1320 includes an embedded MMC (eMMC). It should be noted that the eMMC is directly coupled to the substrate of the host system.

Figure 2:
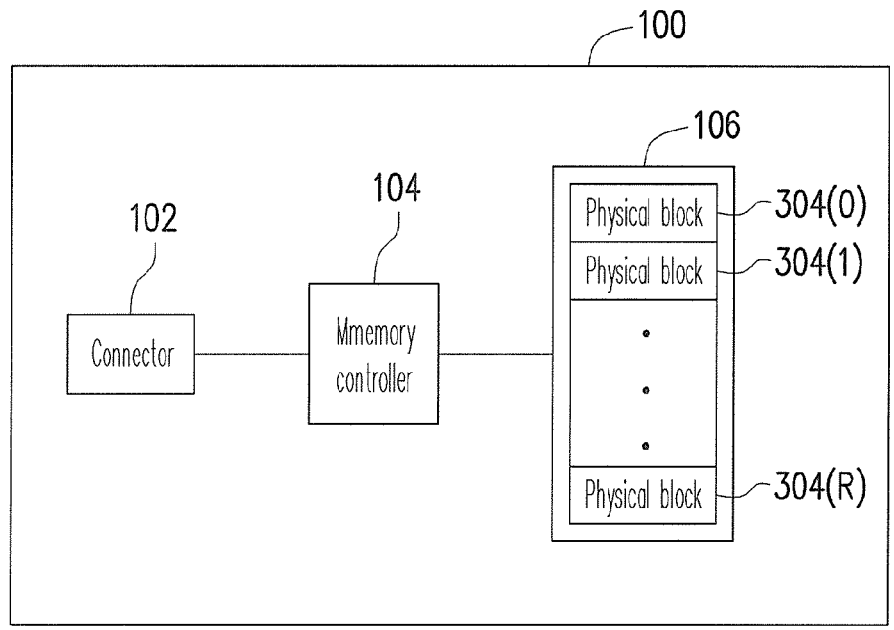
FIG. 2 is a schematic block diagram of the memory storage apparatus in FIG. 1A.

FIG. 2 is a schematic block diagram of the memory storage apparatus in FIG. 1A.

Referring to FIG. 2, the memory storage apparatus 100 includes a connector 102, a memory controller 104, and a memory module 106.

In the present exemplary embodiment, the connector 102 is a secure digital (SD) interface connector. However, it should be noticed that the present invention is not limited to the aforementioned description and the connector 102 also can be a universal serial bus (USB) connector, an institute-of-electrical-and-electronic-engineers (IEEE) 1394 connector, a peripheral-component Interconnect-express (PCI Express) connector, a Serial Advanced Technology Attachment (SATA) connector, a memory stick (MS) interface connector, a multi-media-card (MMC) interface connector, a compact flash (CF) interface connector, an integrated-device-electronics (IDE) connector or other suitable type of connectors.

The memory controller 104 executes a plurality of logic gates or control instructions implemented in a hardware form or a firmware form and performs various data operations such as data writing, reading, and erasing in the memory module 106 according to commands of the host system 1000. In particular, the memory controller 104 is configured for executing a data access method and a memory management method according to the present exemplary embodiment.

The memory module 106 is coupled to the memory controller 104 and configured for temporarily storing data written by the host system 1000. The memory module 106 includes physical blocks 304(0)~304(R). Each of the physical blocks has a plurality of physical pages, wherein the physical pages belonging to the same physical block can be written individually and must be erased all together. In detail, each physical block is the smallest erasing unit. Namely, each physical block contains the least number of memory cells that are erased together. And, one physical page is the smallest programming unit. Namely, each physical page is the smallest unit for writing data.

In this exemplary embodiment, the memory module 106 is a rewritable non-volatile memory module. For example, the memory module 106 is a multi-level cell (MLC) NAND flash memory module. However, the present invention is not limited thereto, and the memory module 106 may also be a single level cell (SLC) NAND flash memory module, other flash memory module or other memory module having the same characteristic.

Figure 3:
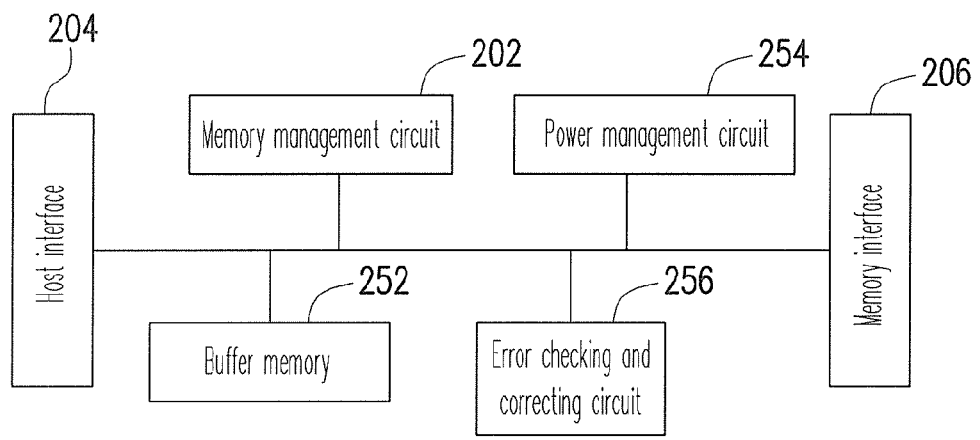
FIG. 3 is a schematic block diagram illustrating a memory controller and a memory module according to the exemplary embodiment of the present invention.

FIG. 3 is a schematic block diagram illustrating the memory controller and the memory module according to the exemplary embodiment of the present invention.

Referring FIG. 3, the memory controller 104 includes a memory management circuit 202, a host interface 204 and a memory interface 206.

The memory management circuit 202 is configured for controlling the whole operation of the memory controller 104. To be specific, the memory management circuit 202 has a plurality of control instructions, and the control instructions are executed to manage the memory module 106 according to the data access method and the memory management method of the present exemplary embodiment when the memory storage apparatus 100 is operated. The data access method and the memory management method will be described with drawings in the following.

In the present exemplary embodiment, the control instructions of the memory management circuit 202 are implemented in a firmware form. For example, the memory management circuit 202 has a micro-processor unit (not shown) and a read-only memory (not shown), and the control instructions are burned into the read-only memory. When the memory storage apparatus 100 is operated, the control instructions are executed by the micro-processor unit to accomplish the data access method and the memory management method according to the present exemplary embodiment.

In another exemplary embodiment of the present invention, the control instructions of the memory management circuit 202 are stored in a specific area (for example, the system area of a memory module exclusively used for storing system data) of the memory module 106 as program codes. Additionally, the memory management circuit 202 may have a micro-processor unit (not shown), a read-only memory (not shown) and a random access memory (not shown). And, the read-only memory has a driver code, and when the memory controller 104 is enabled, the micro-processor unit executes the driver code to load the control instructions stored in the memory module 106 into the random access memory of the memory management circuit 202. Then, the micro-processor unit runs these control instructions to accomplish the data access method and the memory management method of the exemplary embodiment of the present invention. Additionally, the control instructions of the memory management circuit 202 may be implemented in a hardware form.

The host interface 204 is coupled to the memory management circuit 202, and configured for receiving and identifying commands and data from the host system 1000. Namely, the commands and data from the host system 1000 are transmitted to the memory management circuit 202 through the host interface 204. In the present exemplary embodiment, the host interface 204 is a SD interface corresponding to the connector 102. However, it should be understood that the invention is not limited thereto, and the host interface 204 can be a PATA interface, a USB interface, an IEEE 1394 interface, a PCI express interface, a SATA interface, a MS interface, a MMC interface, a CF interface, an IDE interface, or other suitable data transmission interfaces.

The memory interface 206 is coupled to the memory management circuit 202 and configured for accessing the memory module 106. Namely, data to be written into the memory module 106 is converted by the memory interface 206 into a format acceptable to the memory module 106.

In another exemplary embodiment of the present invention, the memory controller 104 still includes a buffer memory 252. The buffer memory 252 is coupled to the memory management circuit 202 and configured to temporarily store data and commands from the host system 1000 or data from the memory module 106.

In another exemplary embodiment of the present invention, the memory controller 104 still includes a power management circuit 254. The power management circuit 254 is coupled to the memory management circuit 202 and configured for controlling the power of the memory storage apparatus 100.

In another exemplary embodiment of the present invention, the memory controller 104 still includes an error checking and correcting circuit 256. The error checking and correcting circuit 256 is coupled to the memory management circuit 202, and configured for executing an error checking and correcting procedure to ensure data accuracy. To be specific, when the memory management circuit 202 receives a write command from the host system 1000, the error checking and correcting circuit 256 generates an error checking and correcting (ECC) code for data corresponding to the write command, and the memory management circuit 202 writes the data and the corresponding ECC code into the memory module 106. Subsequently, when the memory management circuit 202 reads the data from the memory module 106, the memory management circuit 202 simultaneously reads the corresponding ECC code, and the error checking and correcting circuit 256 executes the ECC procedure for the read data based on the ECC code corresponding to the read data.

Figure 4:
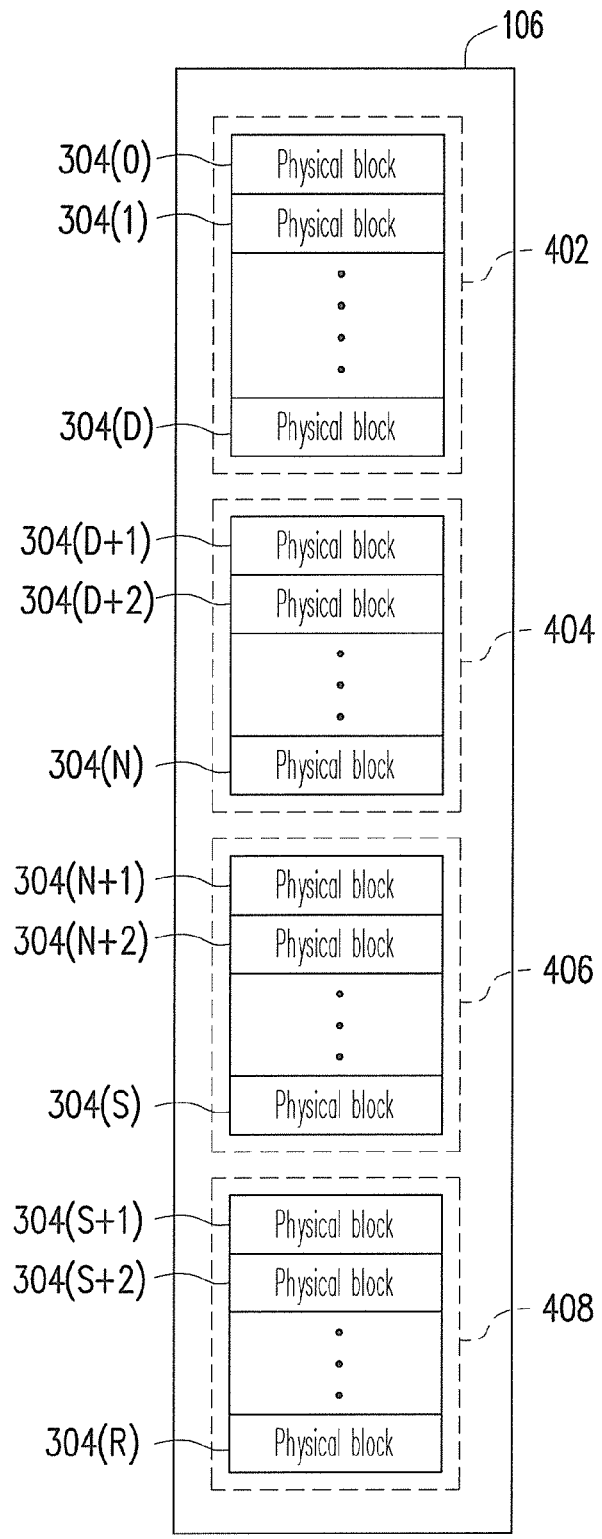
FIG. 4 and FIG. 5 are diagrams of managing the memory module according to the exemplary embodiment of the present invention.
Figure 5:
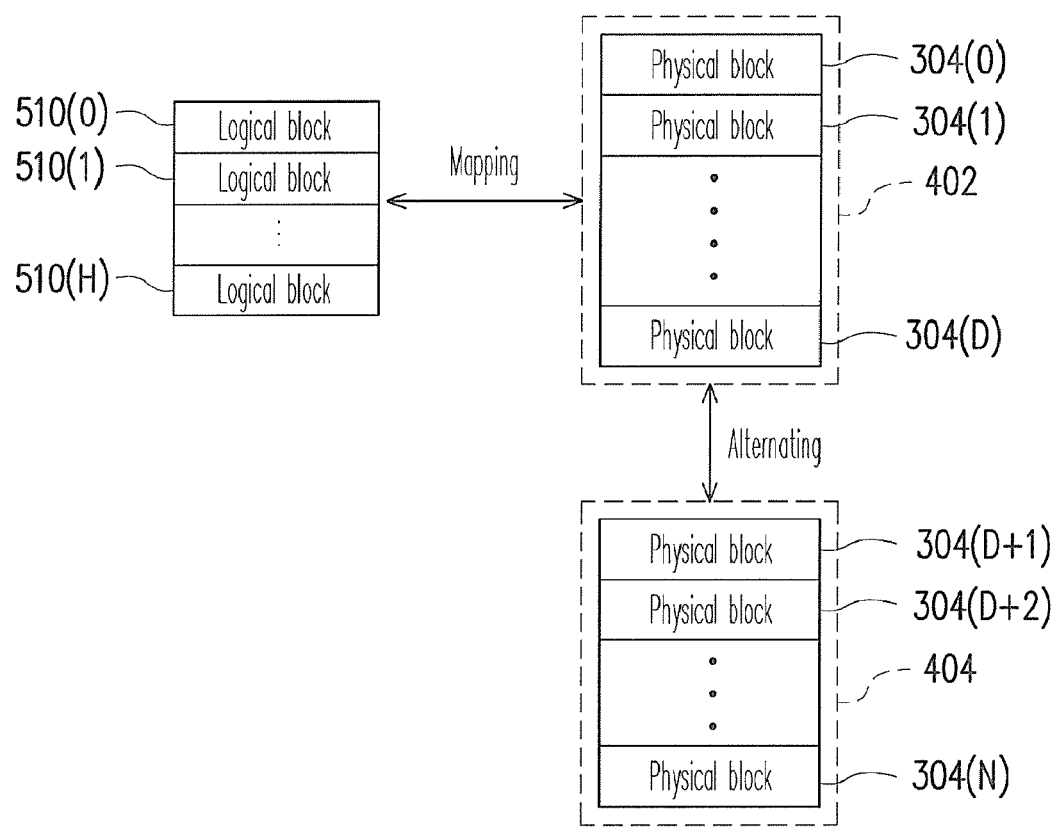

FIG. 4 and FIG. 5 are diagrams of managing the memory module according to the exemplary embodiment of the present invention.

It should be understood that the terms used herein for describing the operations (for example, "get", "select", "replace", "group", and "alternate", etc) performed on the physical blocks of the memory module 106 refer to logical operations performed on these physical blocks. Namely, the physical blocks in the memory module 106 are only logically operated and the actual positions thereof are not changed.

Referring to FIG. 4, the memory management circuit 202 may logically group the physical blocks 304(0)~304(R) of the memory module 106 into a data area 402, a spare area 404, a system area 406 and a replacement area 408.

The physical blocks of the data area 402 and the spare area 404 are used for storing data written by the host system 1000. To be specific, the physical blocks of the data area 402 are physical blocks which have been used for storing data, and the physical blocks of the spare area 404 are physical blocks which are used for substituting the physical blocks of the data area 402. Hence, the physical blocks of the spare area 404 are either blank or available blocks (i.e., no data is recorded in these blocks or data recorded in these blocks is marked as invalid data). That is, the physical blocks of the spare area 404 have been operated by an erasing operation, or when a physical block of the spare area 404 is gotten for storing data, the gotten physical block needs to be operated by the erasing operation first. Hence, the physical blocks of the spare area 404 are available physical blocks.

The physical blocks logically belonging to the system area 406 are used for recording system data, which includes information related to the manufacturer and a model of the memory module, the number of the zones in each memory module, the number of the physical blocks in each zone, the number of the physical pages in each physical block, and so forth.

The physical blocks logically belonging to the replacement area 408 are replacement physical blocks. For example, when the memory module 106 is manufactured in the factory, 4% of the physical blocks thereof are reserved for replacement. Namely, when any physical block in the data area 402, the spare area 404, and the system area 406 is damaged, a physical block in the replacement area 408 is used for replacing the damaged physical block (i.e., the bad block). Thus, if there are still normal physical blocks in the replacement area 408 and a physical block is damaged, the memory management circuit 202 gets a normal physical block from the replacement area 408 for replacing the damaged physical block. If there is no more normal physical block in the replacement area 408 and a physical block is damaged, the memory storage apparatus 100 is announced as being in a write-protect status and cannot be used for writing data anymore.

In particular, the numbers of the physical blocks in the data area 402, the spare area 404, the system area 406 and the replacement area 408 are various based on different standards of the memory modules. Additionally, it has to be understood that the grouping relationships of grouping the physical blocks into the data area 402, the spare area 404, the system area 406 and the replacement area 408 are dynamically changed during the operation of the memory storage apparatus 100. For example, when a physical block of the spare area 404 is damaged and replaced by a physical block of the replacement area 408, the physical block of the replacement area 408 is associated with the spare area 404.

Referring to FIG. 5, as described above, the physical blocks of the data area 402 and the spare area 404 are alternated to store data written by the host system 1000. In the present exemplary embodiment, the memory management circuit 202 configures logical addresses for the host system 1000 to properly access data in the physical blocks that store data with the above-mentioned alternate manner. In particular, the memory management circuit 202 groups the logical addresses into logical blocks 510(0)~510(H) and maps the logical blocks 510(0)~510(H) to the physical blocks of the data area 402. For example, when the memory storage apparatus 100 is formatted by the operation system 1200 with a file system (e.g., FAT 32), the logical blocks 510(0)~510(H) map to the physical blocks 304(0)~304(D) of the data area 402, respectively. That is, one logical block maps to one physical block in the data area 402. Herein, the memory management circuit 202 establishes a logical block-physical block mapping table for recoding mapping relationships between the logical blocks and the physical blocks.

Figure 6:
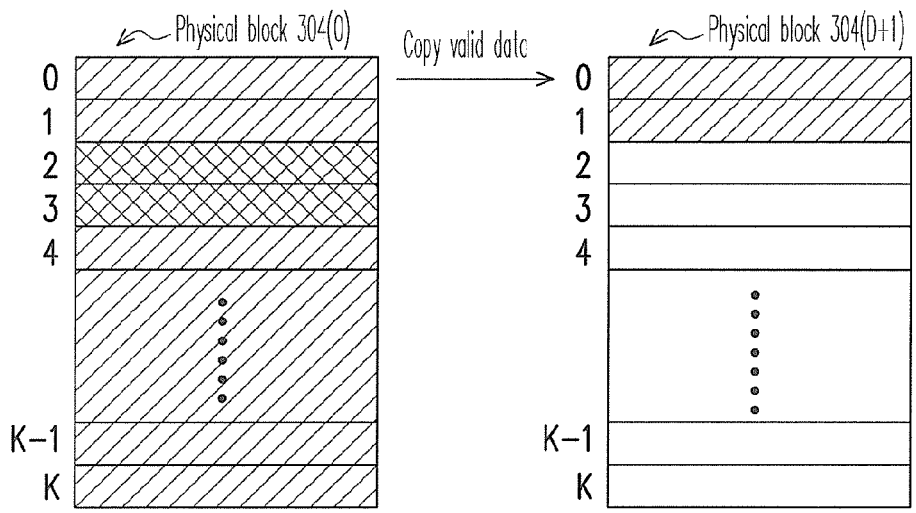
FIGS. 6~8 are diagrams illustrating an example of writing data into the memory module according to the exemplary embodiment of the present invention.
Figure 7:
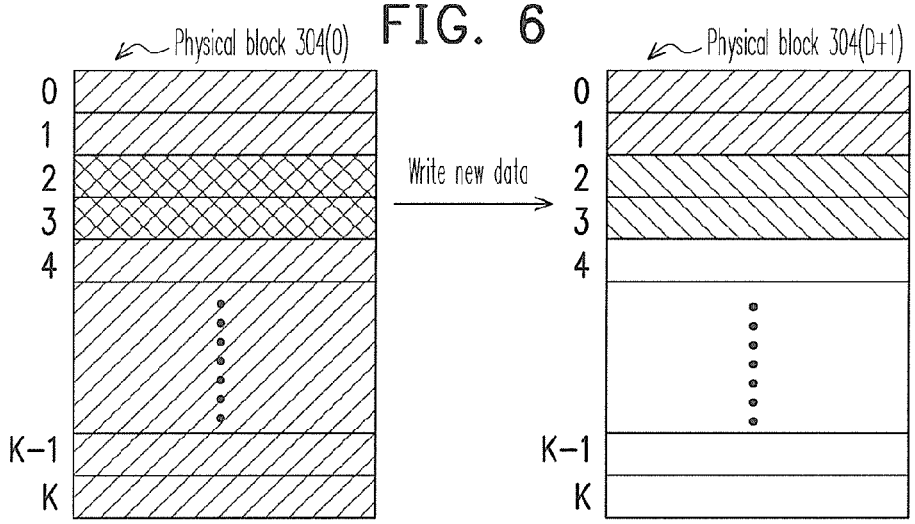
Figure 8:
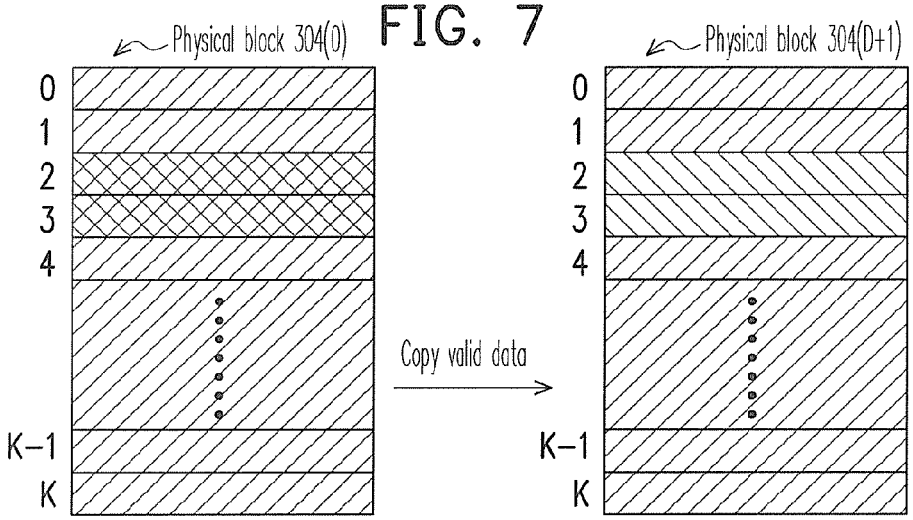

FIGS. 6~8 are diagrams illustrating an example of writing data into the memory module according to the exemplary embodiment of the present invention.

Referring to FIGS. 6~8, for example, under a mapping status where the logical block 510(0) currently maps to the physical block 304(0), when the memory controller 104 receives a write command from the host system 1000 for writing data into the logical addresses belonging to the logical block 510(0), the memory management circuit 202 identifies that the logical unit 510(0) currently maps to the physical block 304(0) based on the logical block-physical block mapping table and gets the physical block 304(D+1) from the spare area 404 as a substitute physical block for substituting the physical block 304(0). However, the memory management circuit 202 does not instantly move all the valid data in the physical block 304(0) into the physical block 304(D+1) and erase the physical block 304(0) when executing the write command. To be specific, the memory management circuit 202 copies the valid data before the physical page for writing the new data in the physical block 304(0) (i.e., the $0^{th}$ physical page and the $1^{st}$ physical page of the physical block 304(0)) to the $0^{th}$ physical page and the $1^{st}$ physical page of the physical block 304 (D+1) (as shown in FIG. 6) and writes the new data into the $2^{nd}$ physical page and the $3^{rd}$ physical page of the physical block 304(D+1) (as shown in FIG. 7). At this time, the memory management circuit 202 completes the writing operation (i.e., the write command has been finished). Because the valid data in the physical block 304 (0) may become invalid during a next operation (for example, next write command), instantly moving all the valid data in the physical block 304(0) to the physical block 304(D+1) may become meaningless. Additionally, because data must be written orderly into the physical pages of the physical blocks, the memory management circuit 202 moves valid data before the physical page to be written first.

In the present exemplary embodiment, the operation of temporarily keeping this temporary relationship (i.e., a relationship between the physical block 304(0) and the physical block 304(D+1)) is referred to as opening mother-child blocks, and the original physical block is referred as a "mother physical block" and the substitute physical block is referred as a "child physical block".

Thereafter, the memory management circuit 202 will integrate the physical block 304(0) and the physical block 304 (D+1) into a single physical block when the contents of the two are to be actually combined, so that the efficiency of using physical blocks can be improved. Herein, the operation of integrating the physical blocks is also referred to as closing mother-child blocks. For example, as shown in FIG. 8, when closing the mother-child blocks, the memory management circuit 202 copies rest of the valid data in the physical block 304(0) (i.e., data stored in the $4^{th}$~$K^{th}$ physical addresses of the physical block 304(0)) to the $4^{th}$~$K^{th}$ physical addresses of the substitute physical block 304(D+1), and then erases the physical block 304(0) and associates the physical block 304 (0) with the spare area 404. Meanwhile, the physical block 304(D+1) is associated with the data area 402. Namely, the memory management circuit 202 re-maps the logical block 510(0) to the physical block 304 (D+1) in the logical block-physical block mapping table. Additionally, in the present exemplary embodiment, the memory management circuit 202 establishes a spare area physical block table (not shown) for recording the physical blocks currently associated with the spare area 404. It should be noted that when opening mother-child blocks, the memory management circuit 202 needs more storage spaces of the buffer memory 252 to store management variables for recoding detail storage statuses. For example, these management variables record which physical pages of the physical blocks 304(0) and 304 (D+1) are used to store valid data of the logical block 510(0) (as shown in FIG. 7). Accordingly, during the operation of the memory storage apparatus 100, the number of mother-child blocks is limited. Therefore, when the memory storage apparatus 100 receives a write command from the host system 1000 and the number of opened mother-child blocks reaches the maximum, the memory management circuit 202 must close one of the opened mother-child blocks, so as to execute the write command.

Figure 9:
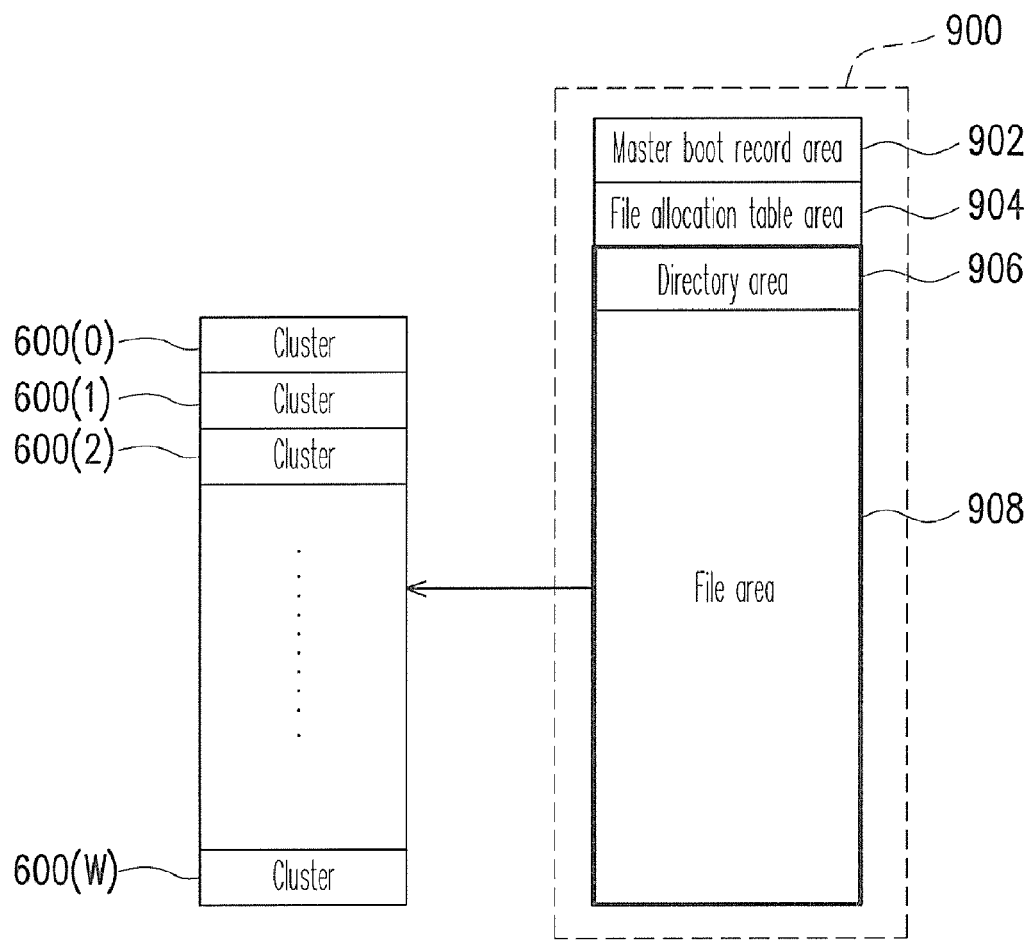
FIG. 9 illustrates an example of formatting the logical addresses of the memory module by a file system according to the exemplary embodiment of the present invention.

In the present exemplary embodiment, the operation system 1200 of the host system 1000 uses a file system to format the logical addresses of the logical blocks 510(0)~510(H) into one partition 900, as shown in FIG. 9. The partition 900 includes a master boot record (MBR) area 902, a file allocation table (FAT) area 904, a directory area 906 and a file area 908.

The storage addresses of the MBR 902 are used for storing system information about the storage spaces of the memory storage apparatus 100.

The storage addresses of the FAT area 904 are used for storing a FAT. The FAT records entry values corresponding to the logical addresses storing files. For example, two FATs are stored in the FAT area 904, wherein one of the FATs is used for normal access, and the other FAT is used as a backup FAT.

The storage addresses of the directory area 906 are used for storing file description blocks (FDBs), wherein the FDBs record the attribute information of files and directories currently stored in the memory storage apparatus 100. In particular, the FDBs record start storage addresses for storing the files (i.e., start clusters).

The storage addresses of the file area 908 are used for actually storing the content of files currently stored in the memory storage apparatus 100.

In this exemplary embodiment, the size of each logical address corresponds to one sector. In the MBR area 904, the FAT area 906 and the directory area 906, data is accessed in unit of each sector.

To be specific, in a disk, the smallest storage unit is one sector and each sector can store 512 bytes of data. However, when storing data in unit of each sector, the performance of the host system 1000 would be not well. In general, the operation system 1200 of the host system 1000 would not take each sector as a unit of accessing data, but takes each cluster as a basic file unit. Each cluster is constructed with $2^n$ sectors. For example, if one cluster is constructed of 8 continuous sectors, then the size of the cluster is 4096 bytes. Accordingly, the operation system 1200 writes or reads data with 8 continuous sectors to enhance the efficiency of accessing data. However, the size of one cluster is not the larger the better. Because one cluster is the larger, the wasted storage spaces will be more. For example, under a situation where the size of one cluster is 4 kilobytes (KB), when the size of a file stored by the host system 1000 just is 1 KB, the file still occupies one cluster and other storage spaces of the cluster would be wasted. In particular, the total of clusters configured in the memory storage apparatus 100 is limited based on the capacity of the memory module 106 and the type of FAT. Taking FAT 16 as an example, the maximum number of clusters must be within 4048~65526 according the design of FAT16. Therefore, when a memory card having 128 megabytes (MB) of storage spaces is formatted by FAT 16, each cluster must be constructed with at least 4 sectors, otherwise the number of clusters in the memory card will exceed 65526 (i.e., 127901/512/4=62452). So, the size of each cluster is 2 KB. Similarly, according to the design of FAT 32, the maximum number of clusters must be within 65526~4177918. It should be noted that according to the design of FAT 16, the size of the directory area 906 is fixed. But, according to the design of FAT 32, the directory area 906 is configured in the file area 908 for managing together. For example, in the present exemplary embodiment, the partition 900 is a partition complied with the standards of FAT 32 (i.e., the partition 900 is generated by FAT 32). Therefore, the sectors belonging to the directory area 906 and the file area 908 are grouped into clusters 600 (0)~600(W). Herein, it is assumed that the cluster 600(0) is configured as a start cluster of the directory area 906.

FIG. 10A and FIG. 10B illustrate an example of a file allocation table and a file description block according to the exemplary embodiment of the present invention.

Referring to FIG. 10A, in the present example, an entry value corresponding to each of the clusters is sequentially recorded in a cluster index field 1002a and an entry value field 1002b of a FAT 1002, wherein each entry value in the FAT 1002 represents the status of corresponding cluster by using special symbols. For example, according to the design of FAT32, "0000000h" represents that the cluster is an idle storage address (i.e., stores no data), "FFFFFF8h"-"FFFFFFFh" represents that the cluster is the last storage address for storing a file. Herein, "FFFFFF8h"-"FFFFFFFh" is referred to an "end mark" (also known as an end of cluster chain mark (EOC mark)).

Referring to FIG. 10B, the file name field 1004a and the start address field 1004b of a file description block 1004 are used for recording the name of a file stored in the memory storage apparatus 100 and the start logical address for storing the file. It should be understood that the file description block 1004 is only an example and which may further include a file length field or other attribute fields for describing the information of the stored file.

Referring to both FIG. 10A and FIG. 10B, it can be understood based on the space information in the file description block 1004 that the memory storage apparatus 100 stores a file "f1.exe" and a file "f2.dll", wherein the start logical address for storing the file "f1.exe" is the cluster 600(1), and the start logical address for storing the file "f2.dll" is the cluster 600(4). In addition, it can be understood that the content of the file "f1.exe" is sequentially stored in the clusters 600(1), 600(2), and 600(3) and the content of the file "f2.dll" is stored in the cluster 600(4) according to the entry values recorded in the FAT 1002.

Moreover, it should be noted, according to the design of FAT 32, the directory area 906 is managed with the file area 908. Therefore, the clusters belonging to the directory area 906 may be expanded dynamically for recoding more file description blocks, such that the number of files that can be stored in the memory storage apparatus 100 is not limited. To be specific, an entry value corresponding to the start cluster of the directory area 906 is recorded in the FAT 1002. For example, as shown in FIG. 10A, when the memory storage apparatus 100 is formatted, the cluster 600(0) is the start cluster of the directory area 906 and the entry value of the cluster 600(0) is "FFFFFFFh". That is to say, only the cluster 600(0) is used for storing the file description block 1004. After that, when the storage spaces of the cluster 600(0) is filled with data, the operation system 1200 selects an empty cluster from the file area 908 based on the FAT 1002 for storing newly added file description block 1004 and the entry value of the cluster 600(0) is updated into the selected cluster at the FAT 1002.

Figure 10C:
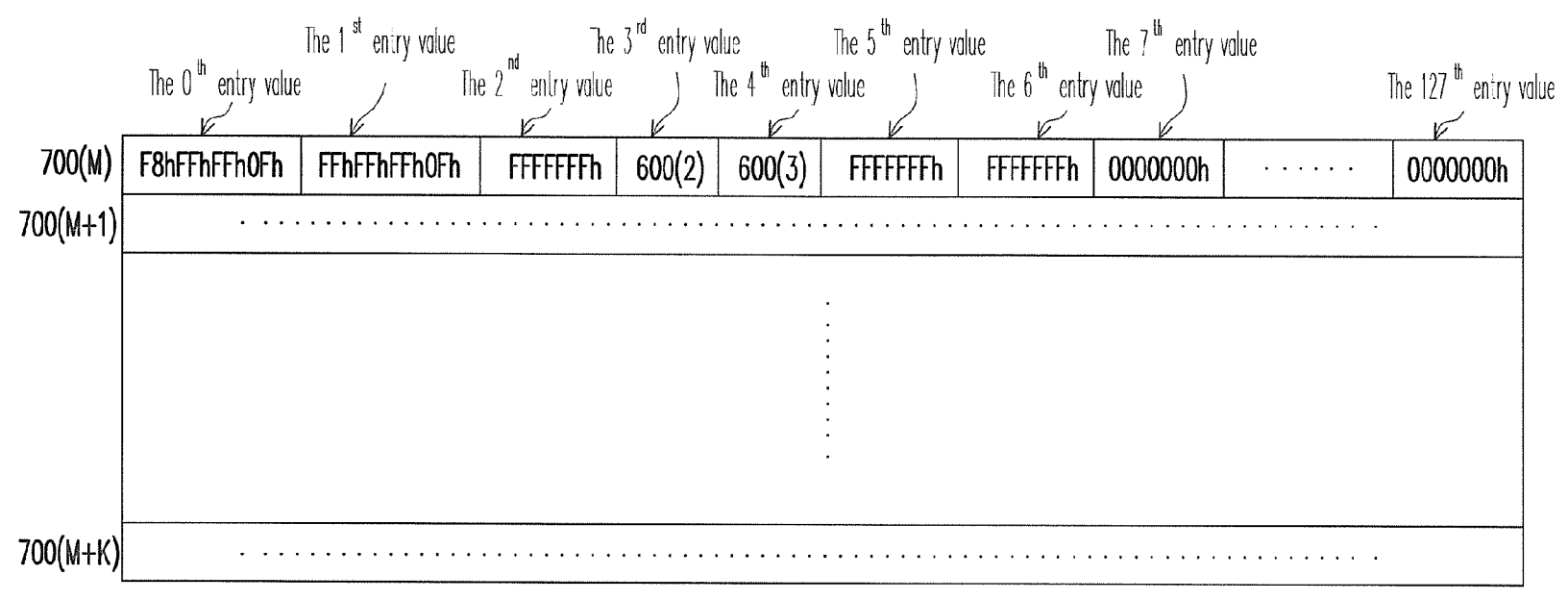

FIG. 10C illustrates an example of a file allocation table area according to the exemplary embodiment of the present invention.

Referring to FIG. 10A and FIG. 10C, the FAT area 904 includes sectors 700(M)~700(M+K). First two entry values of the sector 700(M) (i.e., first eight bytes) are reserved and recorded with "F8hFFhFFh0Fh" and "FFhFFhFFh0Fh". The $2^{nd}$ entry vale is "FFFFFFFh" and corresponds to the cluster 600(0). The $3^{rd}$ entry vale is "600(2)" and corresponds to the cluster 600(1). The $4^{th}$ entry vale is "600(3)" and corresponds to the cluster 600(2). The $5^{th}$ entry vale is "FFFFFFFh" and corresponds to the cluster 600(3). The $6^{th}$ entry vale is "FFFFFFFh" and corresponds to the cluster 600(4). The $7^{th}$ entry vale is "0000000h" and corresponds to the cluster 600(5). By the same token, the entry values corresponding to the clusters 600(0)~600(W) are recorded in the sectors of the FAT area 904.

In the present exemplary embodiment, the memory controller 104 divides the logical addresses (i.e., sectors) of the logical blocks of partition 900 into a first part and a second part.

In particular, when the host system 1000 gives a write command for writing data into logical blocks belonging to the first part, the memory controller 104 will not write the data into physical blocks mapped to these logical blocks and not transmit any error message to the host system 1000. To be specific, the host system 1000 receives an acknowledgement message indicating that the write command has be finished from the memory controller 104, but the data is not written into the corresponding physical block of the memory module 106, actually.

Additionally, when the host system 1000 gives a write command for writing data into logical blocks belonging to the second part, the memory controller 104 will write the data into physical blocks mapped to these logical blocks according to the write command.

That is, in the partition 900 formatted by the operation system 1200 with the file system, the logical blocks of the first part is set as a write-protect area and the logical blocks of the second part is set as a writable area.

Figure 11A:
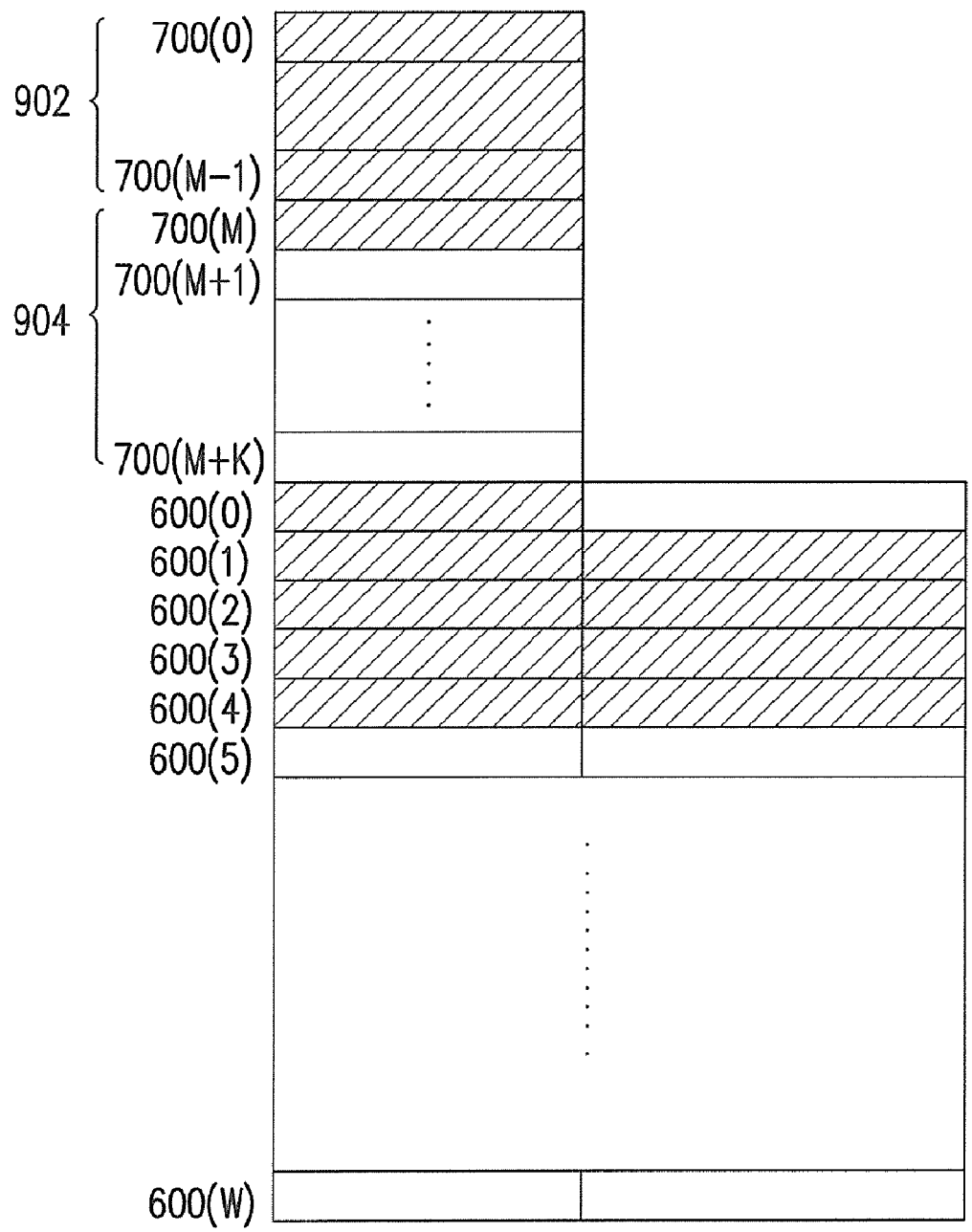
FIGS. 11A and 11B are diagrams of setting logical addresses as a write-protect area according to the exemplary embodiment of the present invention.
Figure 11B:
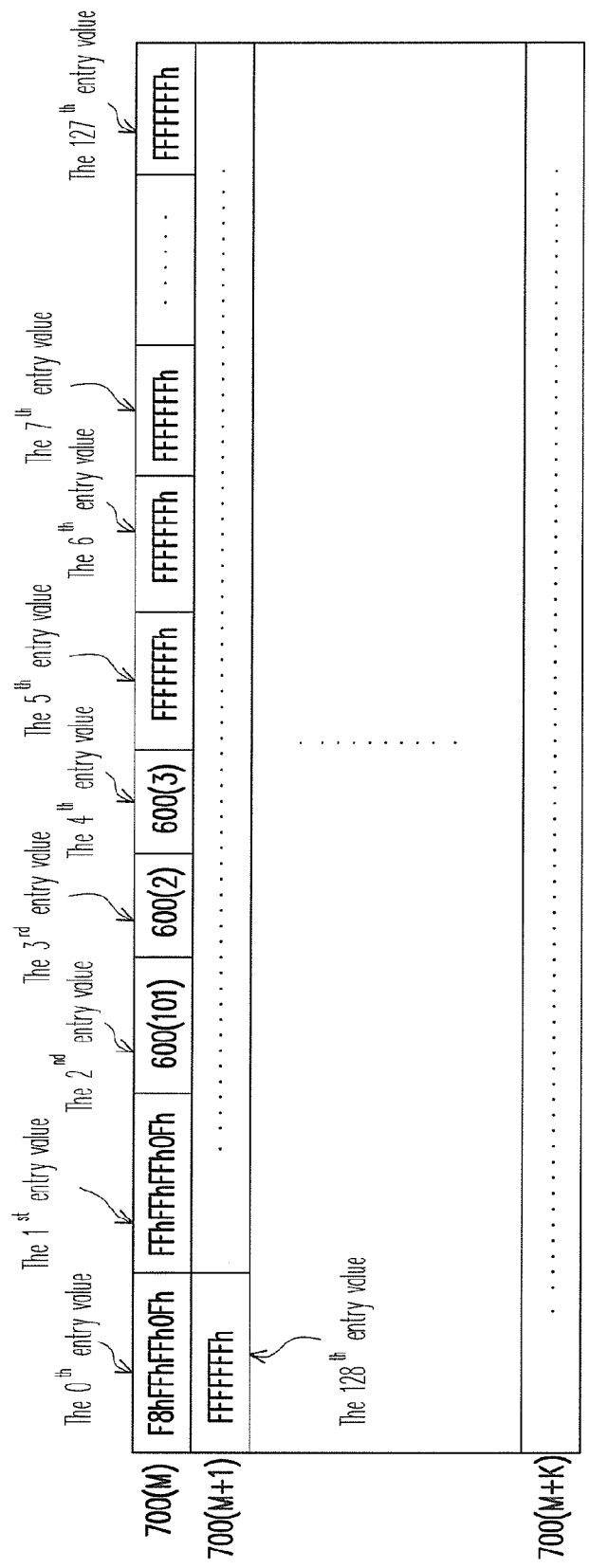

FIGS. 11A and 11B are diagrams of setting logical addresses as a write-protect area according to the exemplary embodiment of the present invention. Herein, it is assumed that the memory storage apparatus 100 stores the file "f1.exe" and the file "f2.dll" and a user (for example, a manufacturer producing navigation machines) is about to set the storage spaces for storing the file "f1.exe" and the file "f2.dll" as the write-protect area.

Referring to FIG. 11A, the memory management circuit 202 of the memory controller 104 may set a portion of logical blocks as the write-protect area (as areas marked with oblique lines) in unit of each sector according to the information recorded in the file system.

To be specific, the MBR area 902 stores information for identifying the partition 900, and therefore the memory management circuit 202 sets the sectors 700(0)~700(M−1) belonging to the MBR area 902 as the write-protect area. Additionally, the memory management circuit 202 sets the clusters 600(1)~600(3) storing the file "f1.exe" and the cluster 600(4) storing the file "f2.dll" as the write-protect area. Furthermore, the memory management circuit 202 sets the sector 700(M), which stores the entry values corresponding to the clusters 600(1)~600(4) in the FAT area 904, as the write-protect area, thereby preventing that these entry values are mistakenly deleted to cause that the file "f1.exe" and the file "f2.dll" can not be read by the host system 1000. In addition, the memory management circuit 202 sets the sectors, which record the file description blocks, in the directory area 906 as the write-protect area, thereby preventing that the information regarding to the file "f1.exe" and the file "f2.dll" from being mistakenly deleted. For example, it is assumed that each cluster is constructed with 2 sectors and the sectors storing the file description blocks corresponding to the file "f1.exe" and the file "f2.dll" in the cluster 600(0) storing the file description blocks are set as the write-protect area.

When the host system 1000 gives a write command for writing data into logical addresses belonging to the write-protect area (as areas marked with oblique lines shown in FIG. 11A), the memory management circuit 202 will not write the data into physical blocks mapped to these logical addresses and not transmit any error message to the host system 1000. That is, even though the host system 1000 writes data into logical addresses belonging to the write-protect area again and again, the data stored in the logical addresses belonging to the write-protect area will not be changed. Additionally, when the host system 1000 gives a write command for writing data into logical addresses belonging to the writable area (as areas without oblique lines shown in FIG. 11A), the memory management circuit 202 will write the data into physical pages of physical blocks mapped to these logical addresses.

It should be noted that in order to add files or directories in the partition 900, in the present exemplary embodiment, because the sector 700(M) of the FAT area 904 is needed to set as the write-protect area, several dummy files are stored into clusters (e.g., the clusters 600(5)~600(125)) corresponded to the 7$^{th}$~127$^{th}$ entry values of the FAT 1002 before executing the above-mentioned setting of the write-protect area, thereby preventing the clusters 600(5)~600(125) from being used for storing data by the operation system 1200. For example, these dummy files may be set as hidden files, such that the host system 1000 will not display these dummy files.

Additionally, referring to FIG. 11B, in order to expand the directory area 906 for storing the added files or directories, before executing the above-mentioned setting of the write-protect area, storage addresses recording the end mark corresponding to the directory area 906 (i.e., the 2$^{nd}$ entry value of the FAT 1002) are searched, an empty cluster (e.g., the cluster 600(126)) is selected as a next cluster for storing the file description blocks and the address serial number of the selected cluster is written into the storage addresses originally recording the end mark corresponding to the directory area 906. In particular, in the FAT 1002, the entry value corresponding to the cluster 600(126) is written with "FFFFFFFh", which represents the cluster 600(126) is the last cluster of the directory area 906. Accordingly, the last cluster of the directory area 906 is not set as the write-protect area, such that new data can be added into the partition 900. However, in another exemplary embodiment, the storage addresses recording the end mark corresponding to the directory area 906 (i.e., the storage address storing the 2$^{nd}$ entry value) are also set outside the write-protect area (the sector 700(M)) and directly set as the default pattern addresses. Accordingly, the last cluster of the directory area 906 is not set as the write-protect area, such that new data can be added into the partition 900.

In the present exemplary embodiment, the operations of adding the dummy files and re-setting the last cluster of the directory area 906 is executed by a tool program (not shown).

It should be noted that in the present exemplary embodiment, the memory management circuit 202 searches the entry values corresponding to the logical addresses storing the file description blocks according to the FAT 1002, marks the logical addresses storing the end mark of the entry values as the default pattern addresses and taking values stored in the logical addresses storing the end mark as default values corresponding to the default pattern addresses. In the present exemplary embodiment, the default values are "FFFFFFFh". However, the present invention is not limited thereto, and in another exemplary embodiment, the default values may be any values representing the end mark. In the present exemplary embodiment, the cluster 600(0) is the start cluster of the directory area 906 and the cluster 600(101) is the last cluster of the directory area 906. Therefore, the memory management circuit 202 identifies the storage addresses recording the entry value corresponding to the cluster 600(101) in the FAT 1002 and marks the storage addresses recording the entry value corresponding to the cluster 600(101) as the default pattern addresses.

In the present exemplary embodiment, when the host system 1000 gives a write command or an erase command to logical addresses set as the default pattern addresses, the memory management circuit 202 may update data stored in the physical pages of physical blocks mapped to these logical addresses according to the command of the host system 1000. Additionally, when the host system 1000 gives a read command to logical addresses set as the default pattern addresses, the memory management circuit 202 may determine whether values currently stored in these logical addresses are empty values. In the present exemplary embodiment, the empty values are values stored in memory cells that just been performed the erasing operation. Herein, the empty values are varied according different memory modules. For example, the empty values may be "0xFF" or "0x00". When the values currently stored in these logical addresses are the empty values, the memory management circuit 202 transmits the default values corresponding to these logical addresses to the host system 1000. Otherwise, when the values currently stored in these logical addresses are not the empty values, the memory management circuit 202 transmits these values to the host system 1000.

That is, in the FAT 1002, the storage addresses storing the end mark corresponding to the file description blocks are marked as the default pattern addresses and the values stored in these storage addresses may be changed and recovered. Therefore, the operation system 1200 of the host system 1000 could write new files and new file description blocks into the writable area of the partition 900 and update the entry values corresponding to the storage addresses storing file description blocks and the end mark in the FAT area 904. According to the described above, the memory management circuit 202 could store new files in the writable area of the partition 900, and prevent the file stored in the write-protect area from deleting.

For example, in the present exemplary embodiment, the memory management circuit 202 may store information regarding to the above-mentioned default pattern addresses and the default values thereof in the physical blocks of the system area 406, or these information may be written into the firmware codes of the memory controller 104.

It should be mentioned that in the present exemplary embodiment, the memory management circuit 202 decides to transmit the default values or the read values to the host system 1000 according to the logical addresses read by the host system 1000. That is, whether the memory management circuit 202 transmits the default values to the host system 1000 or not is determined during a read command is executed. Nevertheless, it should be understood that the present invention is not limited thereto. In another exemplary embodiment of the present invention, whether the memory management circuit 202 actually writes data into the physical pages of a physical block or not is determined during a write command is executed. For example, when the host system 1000 gives a write command or an erase command to logical addresses set as the default pattern addresses, the memory management circuit 202 may determine whether values to be written are the empty values. And, if the values to be written are the empty values, the memory management circuit 202 could not update values stored in the physical pages of a physical block mapped to these logical addresses. On the other hand, if the values to be written are not the empty values, the memory management circuit 202 updates values stored in the physical pages of a physical block mapped to these logical addresses according to the command from the host system 1000. Namely, when the values to be written are the empty values, it represents that the host system 1000 is about to execute the erasing operation. Accordingly, the memory management circuit 202 will not allow that data stored in the default pattern addresses is deleted. And, when the values to be written are not the empty values, it represents that the host system 1000 is about to add new files. Accordingly, the memory management circuit 202 will allow that data stored in the default pattern addresses is updated. Then, when the host system 1000 gives a read command, the memory management circuit 202 transmits the read values to the host system 1000.

It should be noted that in the present exemplary embodiment, before executing the above-mentioned setting of the write-protect area, the storage addresses recording the end mark corresponding to the directory area 906 in the FAT 1002 are adjusted. However, in another exemplary embodiment, the storage addresses recording the end mark corresponding to the directory area 906 (i.e., the storage addresses storing the $2^{nd}$ entry value) could be set directly set as the default pattern addresses without being adjusting. Accordingly, even though the sector 700(M) has been set as the write-protect area, the memory management circuit 202 still changes or recovers values stored in the storage addresses storing the $2^{nd}$ entry value based on the above-mentioned operations.

In the exemplary embodiment, the memory management circuit 202 sets the logical addresses of the memory module 106 as the write-protect area in unit of each sector. However, the present invention is not limited thereto, and in another exemplary embodiment, the memory management circuit 202 may set the logical addresses of the memory module 106 as the write-protect area in unit of each byte.

Figure 12:
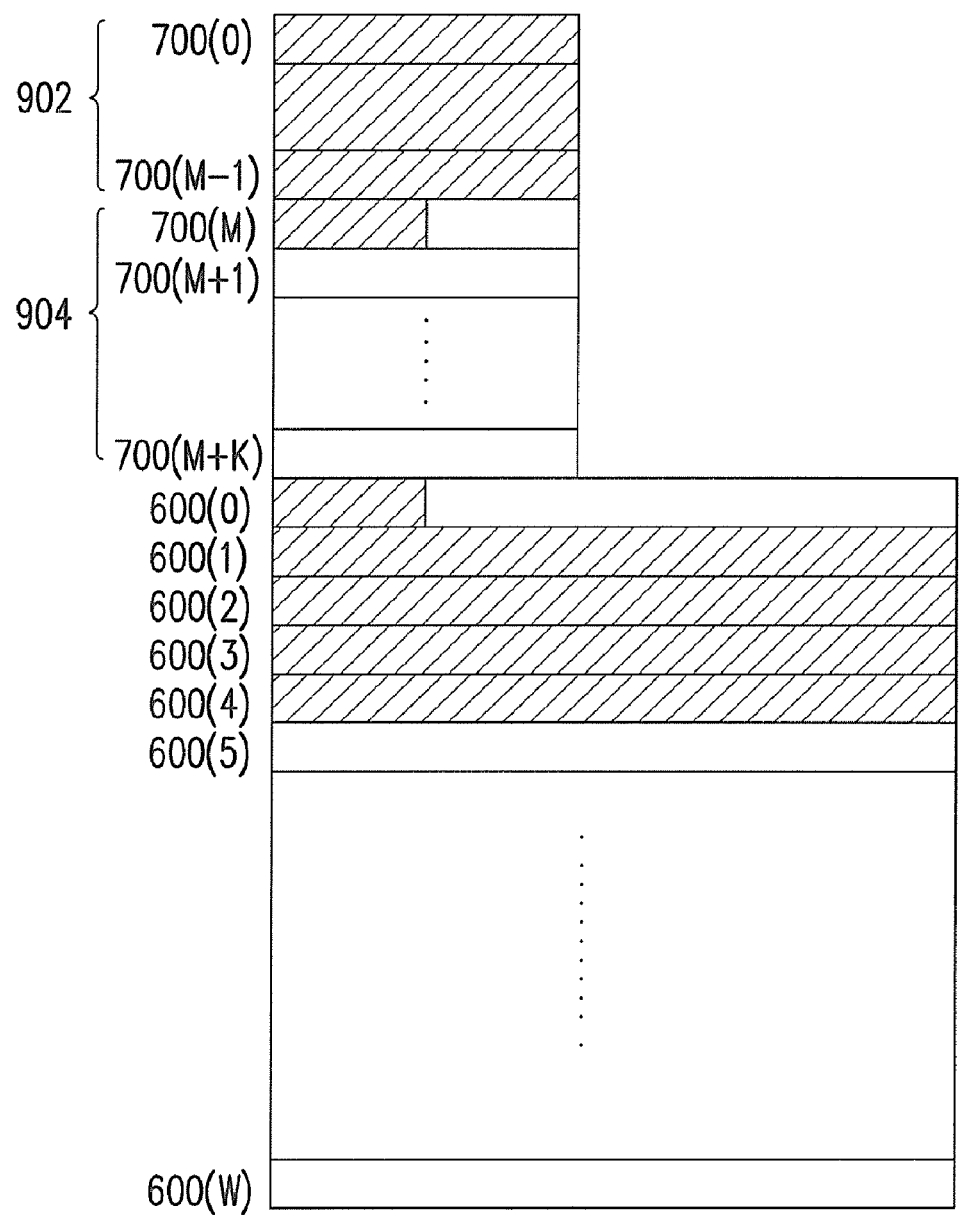
FIG. 12 is a diagram of setting logical addresses as a write-protect area according to another exemplary embodiment of the present invention.

FIG. 12 is a diagram of setting logical addresses as the write-protect area according to another exemplary embodiment of the present invention, wherein the write-protect area is set in unit of each byte.

Referring to FIG. 12, similarly, the MBR area 902 stores the information for identifying the partition 900, and therefore the memory management circuit 202 sets the sectors 700(0)~700(M−1) belonging to the MBR area 902 as the write-protect area. Additionally, the memory management circuit 202 sets the clusters 600(1)~600(3) storing the file "f1.exe" and the cluster 600(4) storing the file "f2.dll" as the write-protect area. Furthermore, the memory management circuit 202 sets storage addresses, which store first two entry values (i.e., the $0^{th}$ entry value and the $1^{st}$ entry value shown in FIG. 10C), and storage addresses, which store the entry values corresponding to the clusters 600(1)~600(4) (i.e., the $2^{nd}$~$6^{th}$ entry values shown in FIG. 10C), in the FAT area 904 as the write-protect area, thereby preventing that these entry values are mistakenly deleted to cause that the file "f1.exe" and the file "f2.dll" can not be read by the host system 1000. In addition, the memory management circuit 202 sets storage addresses, which record the file description blocks, in the directory area 906 as the write-protect area, thereby preventing that the information regarding to the file "f1.exe" and the file "f2.dll" from being mistakenly deleted. For example, it is assumed that each cluster is constructed with 2 sectors and the sectors storing the file description blocks corresponding to the file "f1.exe" and the file "f2.dll" in the cluster 600(0) are set as the write-protect area. Additionally, it is assumed that the $4^{th}$~$19^{th}$ bytes of the cluster 600(0) record the entry values corresponding to the file "f1.exe" and the file "f2.dll" and the memory management circuit 202 sets the $4^{th}$~$19^{th}$ bytes of the cluster 600(0) as the write-protect area. In addition, the memory management circuit 202 sets logical addresses, which record the file description blocks (as areas marked with oblique lines shown in FIG. 11A), in the directory area 906 as the write-protect area, thereby preventing that the information regarding to the file "f1.exe" and the file "f2.dll" from being mistakenly deleted.

It should be mentioned that the host system 1000 writes data in unit of each sector, and therefore the memory management circuit 202 could identify which bytes among logical addresses written by the host system 1000 are set as the write-protect area.

Figure 13:
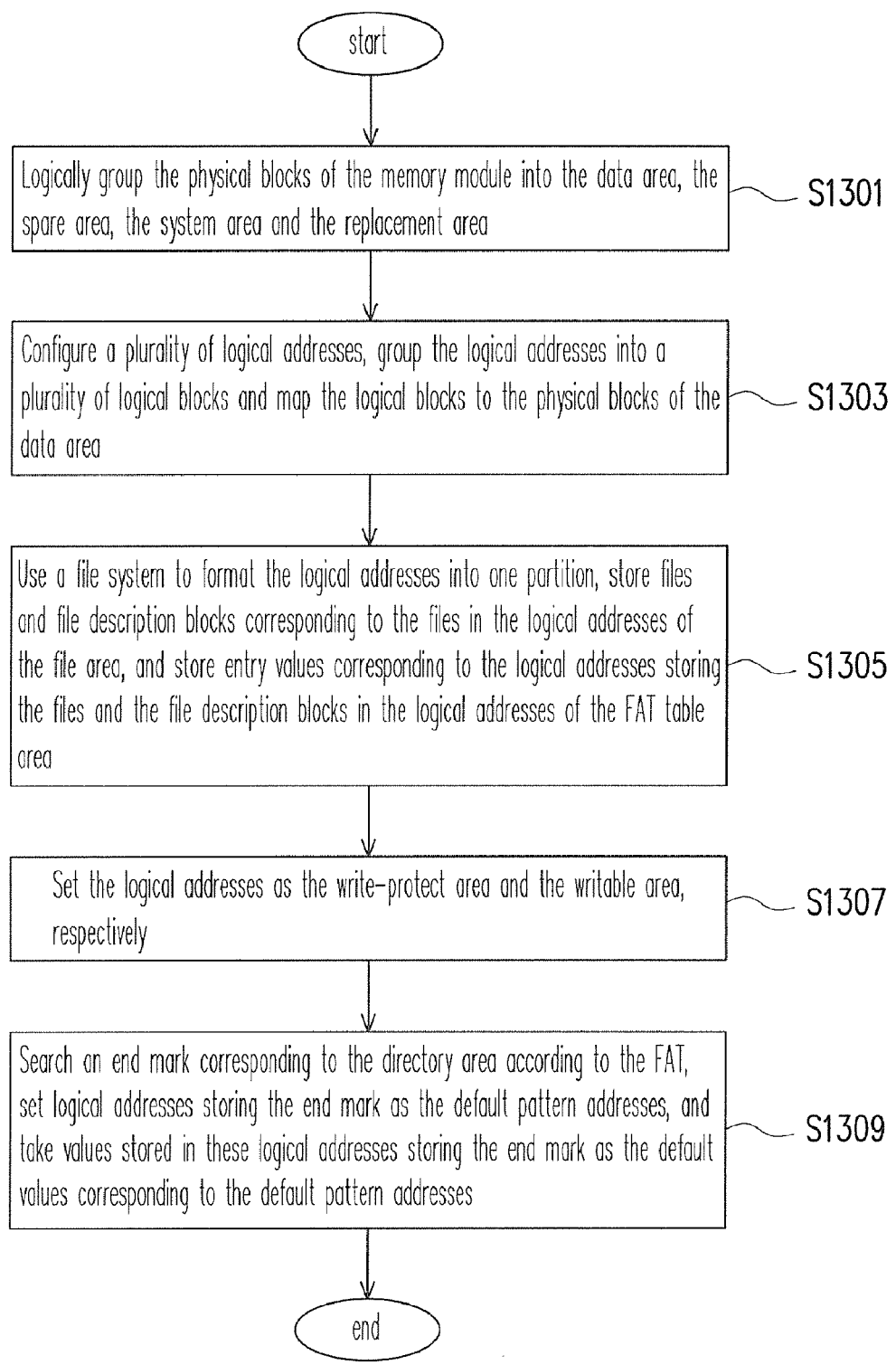
FIG. 13 is a flowchart of setting a write-protect area and default pattern addresses according to a data access method of the exemplary embodiment of the present invention.

FIG. 13 is a flowchart of setting the write-protect area and the default pattern addresses according to the data access method of the exemplary embodiment of the present invention.

Referring to FIG. 13, in step S1301, the memory management circuit 202 logically groups the physical blocks 304(0)~304(R) of the memory module 106 into the data area 402, the spare area 404, the system area 406 and the replacement area 408. Then, in step S1303, the memory management circuit 202 configures a plurality of logical addresses, groups the logical addresses into a plurality of logical blocks and maps the logical blocks to the physical blocks of the data area 402.

After that, in step S1305, the operation system 1200 of the host system 1000 uses a file system to format the logical addresses into one partition, stores files and file description blocks corresponding to the files in the logical addresses of the file area, and stores entry values corresponding to the logical addresses storing the files and the file description blocks in the logical addresses of the FAT table area. Herein, when the operation system 1200 writes data into the logical addresses, the memory management circuit 202 actually writes the data into the physical blocks as the operation shown in FIGS. 6~8.

Then, in step S1307, the memory management circuit 202 sets the logical addresses as the write-protect area and the writable area, respectively (as shown in FIG. 11).

And, in step S1309, the memory management circuit 202 searches an end mark corresponding to the directory area 906 according to the FAT 1002, sets logical addresses storing the end mark as the default pattern addresses, and takes values stored in these logical addresses storing the end mark as the default values corresponding to the default pattern addresses. For example, the memory management circuit 202 writes the information regarding to the default pattern addresses and the default values in the physical blocks of the system area 406.

Figure 14:
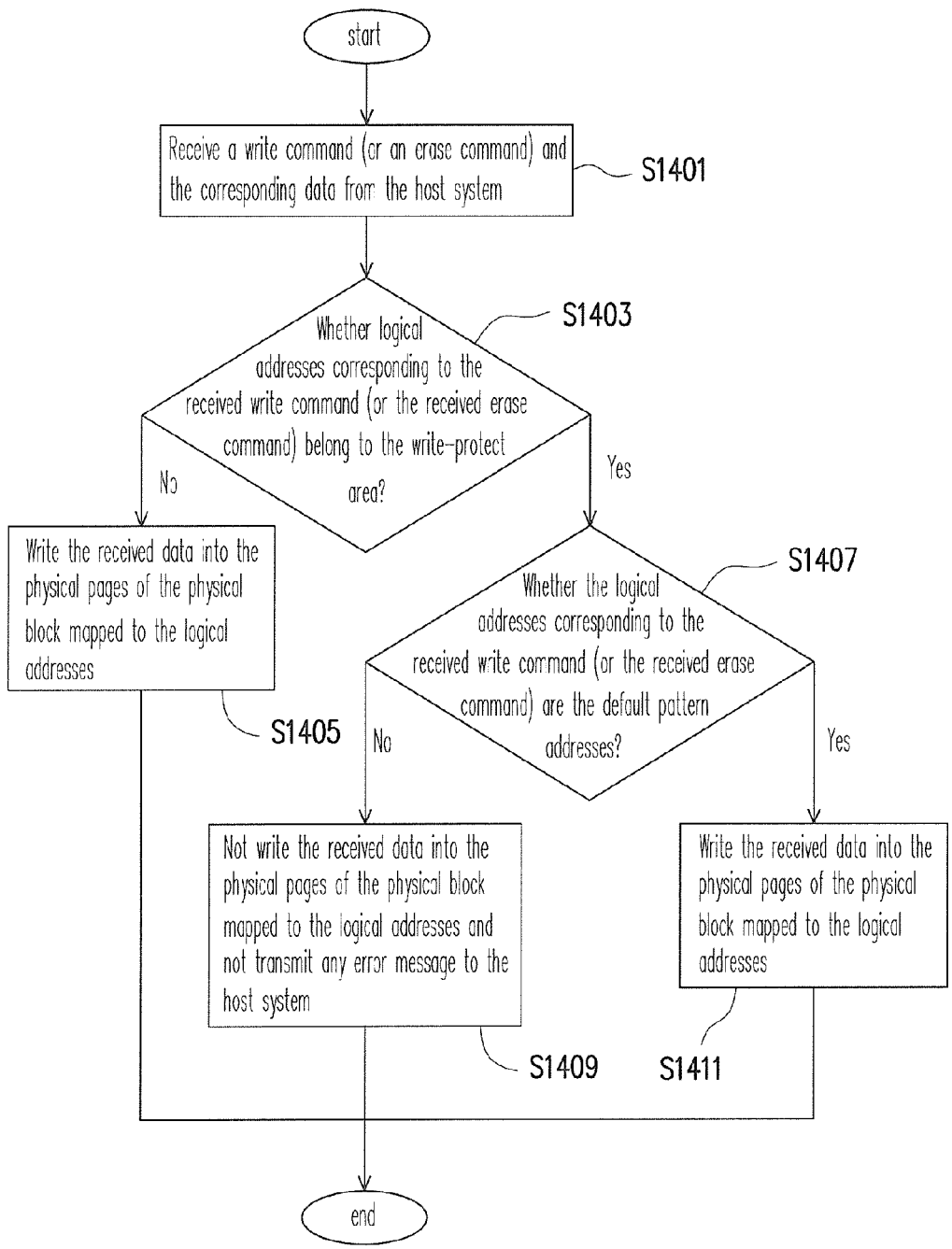
FIG. 14 is a flowchart of executing a write command or an erase command according to the data access method of the exemplary embodiment of the present invention.

FIG. 14 is a flowchart of executing a write command or an erase command according to the data access method of the exemplary embodiment of the present invention.

Referring to FIG. 14, in step S1401, the memory management circuit 202 receives a write command (or an erase command) and the corresponding data from the host system 1000.

After that, in step S1403, the memory management circuit 202 determines whether logical addresses corresponding to the received write command (or the received erase command) belong to the write-protect area. To be specific, the memory management circuit 202 determines whether the host system 1000 is about to write data into logical addresses belonging to the write-protect area according to the setting shown in FIG. 13.

If the logical addresses corresponding to the received write command (or the received erase command) do not belong to the write-protect area, in step S1405, the memory management circuit 202 writes the received data into the physical pages of the physical block mapped to the logical addresses.

If the logical addresses corresponding to the received write command (or the received erase command) belong to the write-protect area, in step S1407, the memory management circuit 202 determines whether the logical addresses corresponding to the received write command (or the received erase command) are the default pattern addresses. To be specific, the memory management circuit 202 determines whether the host system 1000 is about to write data into the default pattern addresses according to the setting shown in FIG. 13. For example, the memory management circuit 202 determines whether the logical addresses to be written are the default pattern addresses by the information regarding to the default pattern addresses and the default values, which is stored in the system area 406.

If the logical addresses corresponding to the received write command (or the received erase command) are not the default pattern addresses, in step S1409, the memory management circuit 202 would not write the received data into the physical pages of the physical block mapped to the logical addresses and not transmit any error message to the host system 1000. To be specific, the memory management circuit 202 transmits an acknowledgement message to inform the host system 1000 that the command has been executed without actually writing the received data. That is, the memory management circuit 202 could not reply any fail message in response to the received write command (or the received erase command).

If the logical addresses corresponding to the received write command (or the received erase command) are the default pattern addresses, in step S1411, the memory management circuit 202 writes the received data into the physical pages of the physical block mapped to the logical addresses.

Figure 15:
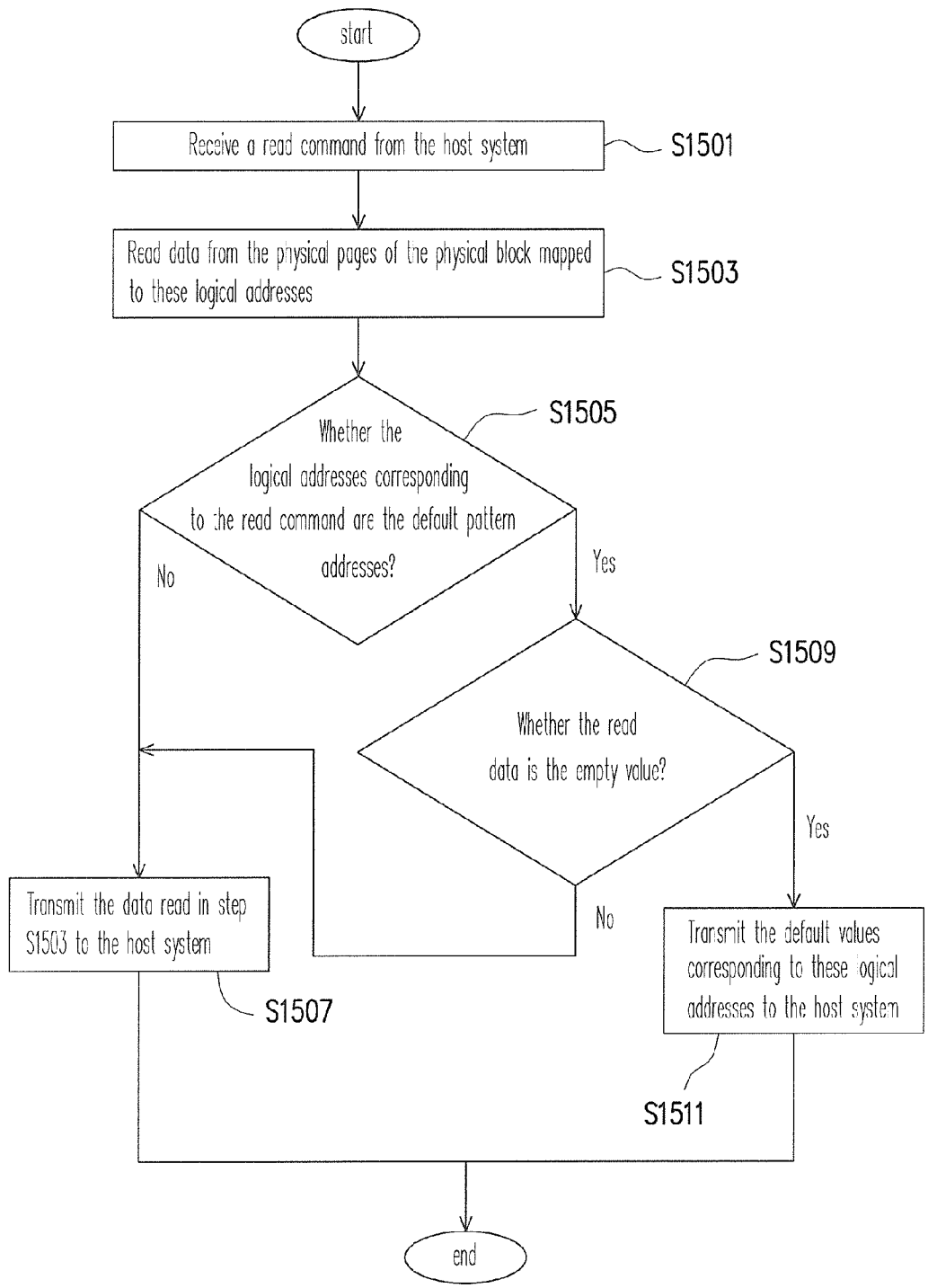
FIG. 15 is a flowchart of executing a read command according to the data access method of the exemplary embodiment of the present invention.

FIG. 15 is a flowchart of executing a read command according to the data access method of the exemplary embodiment of the present invention.

Referring to FIG. 15, in step S1501, the memory management circuit 202 receives a read command from the host system 1000.

Then, in step S1503, the memory management circuit 202 reads data from the physical pages of the physical block mapped to these logical addresses.

After that, in step S1505, the memory management circuit 202 determines whether the logical addresses corresponding to the read command are the default pattern addresses. To be specific, the memory management circuit 202 determines whether the host system 1000 is about to read data from the default pattern addresses according to the setting shown in FIG. 13. For example, the memory management circuit 202 determines whether the logical addresses to be read are the default pattern addresses by the information regarding to the default pattern addresses and the default values, which is stored in the system area 406.

If the logical addresses corresponding to the received read command are not the default pattern addresses, in step S1507, the memory management circuit 202 transmits the data read in step S1503 to the host system 1000.

If the logical addresses corresponding to the received read command are the default pattern addresses, in step S1509, the memory management circuit 202 determines whether the read data is the empty value.

If the read data is not the empty value, then step S1507 is executed.

If the values read data is the empty value, in step S1511 the memory management circuit 202 transmits the default values corresponding to these logical addresses to the host system 1000.

In summary, the data access method according to the exemplary embodiment of the present invention sets a portion of storage addresses as default pattern addresses and records default values thereof, such that values stored in the default pattern addresses can be changed and recovered. Additionally, by setting logical addresses belonging to the FAT area as the default pattern addresses, the data access method according to the exemplary embodiment of the present invention is capable of setting a portion of storage addresses as a write-protect area in one partition formatted by a file system, and setting another portion of the storage addresses as a writable area. Accordingly, the data access method according to the exemplary embodiment of the present invention is capable of making a memory card to simultaneously have a write-protect area and a writable area, and thereby important files stored in the memory card can be protected effectively. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data access method, for accessing a non-volatile memory module, wherein the non-volatile memory module has a plurality of physical blocks, the data access method comprising:

at least grouping the physical blocks into a data area, a spare area, and a system area;

configuring a plurality of logical addresses and grouping the logical addresses into a plurality of logical blocks for mapping to the physical blocks of the data area;

using a file system to format the logical addresses into one partition, wherein the partition has a file and a file description block (FDB) corresponding to the file, and the partition has at least one file allocation table for storing at least one entry value corresponding to the logical addresses storing the file description block;

searching an end mark among the at least one entry value according to the at least one file allocation table;

setting at least one logical address storing the end mark among the logical addresses storing the at least one file allocation table as at least one default pattern address; and taking at least one value stored in the at least one logical address storing the end mark as at least default value corresponding to the at least one default pattern address.

2. The data access method according to claim 1, further comprising:

storing information regarding the at least one default pattern address and the at least one default value in the physical blocks of the system area.

3. The data access method according to claim 1, further comprising:

receiving a read command corresponding to the at least one default pattern address from a host system;

determining whether a value stored in the at least one default pattern address is an empty value;

transmitting the at least one default value corresponding to the at least one default pattern address to the host system when the value stored in the at least one default pattern address is the empty value; and transmitting the value stored in the at least one default pattern address to the host system when the value stored in the at least one default pattern address is not the empty value.

4. The data access method according to claim 1, further comprising:

at least dividing the logical addresses in the partition into a master boot record area, a file allocation table area and a file area;

grouping the logical addresses of the master boot record area, the file, the file description block and the at least one entry value among the logical addresses into a first portion and grouping other logical addresses among the logical addresses into a second portion; and determining whether the logical addresses to be written by a first write command corresponding to the logical addresses of the first portion correspond to the at least one default pattern address when receiving the first write command and at least one first data corresponding to the first write command from a host system, wherein the at least one first data is written into the logical addresses to be written by the first write command when the logical addresses to be written by the first write command correspond to the at least one default pattern address, wherein the at least one first data is not written into the logical addresses to be written by the first write command and an error message is not transmitted to the host system when the logical addresses to be written by the first write command do not correspond to the at least one default pattern address.

5. The data access method according to claim 4, further comprising:

writing at least one second data into the logical addresses to be written by a second write command corresponding to the logical addresses of the second portion when receiving the second write command and the at least one second data corresponding to the second write command from the host system.

6. The data access method according to claim 1, further comprising:

at least dividing the logical addresses in the partition into a master boot record area, a file allocation table area and a file area;

writing at least one dummy file into the logical addresses; and grouping the logical addresses of the master boot record area, the file, the file description block and the at least one entry value among the logical addresses into a first portion and grouping the other logical addresses among the logical addresses into a second portion in unit of a sector.

7. The data access method according to claim 1, further comprising:

at least dividing the logical addresses in the partition into a master boot record area, a file allocation table area and a file area; and grouping the logical addresses of the master boot record area, the file, the file description block and the at least one entry value among the logical addresses into a first portion and grouping the other logical addresses among the logical addresses into a second portion in unit of a byte.

8. The data access method according to claim 1, wherein the logical addresses storing the file among the logical addresses of the file area are continuous.

9. The data access method according to claim 1, further comprising:

at least dividing the logical addresses in the partition into a master boot record area, a file allocation table area and a file area;

grouping the logical addresses of the master boot record area, the file, the file description block and the at least one entry value among the logical addresses into a first portion and grouping other logical addresses among the logical addresses into a second portion; and determining whether the logical addresses to be written by a first write command corresponding to the logical addresses of the first portion correspond to the at least one default pattern address when receiving the first write command and at least one first data corresponding to the first write command from a host system, wherein whether the at least one first data is an empty value is determined when the logical addresses to be written by the first write command correspond to the at least one default pattern address, wherein the at least one first data is written into the logical addresses to be written by the first write command when the at least one first data is not the empty value, wherein the at least one first data is not written into the logical addresses to be written by the first write command and an error message is not transmitted to the host system when the at least one first data is the empty value, wherein the at least one first data is not written into the logical addresses to be written by the first write command and an error message is not transmitted to the host system when the logical addresses to be written by the first write command do not correspond to the at least one default pattern address.

10. A memory controller, for managing a non-volatile memory module, wherein the non-volatile memory module has a plurality of physical blocks, the memory controller comprising:

a host interface, configured to couple to a host system;

a memory interface, configured to couple to the non-volatile memory module; and a memory management circuit, coupled to the host interface and the memory interface, wherein the memory management circuit is configured to:

at least group the physical blocks into a data area, a spare area, and a system area;

configure a plurality of logical addresses and group the logical addresses into a plurality of logical blocks for mapping to the physical blocks of the data area;

use a file system to format the logical addresses into one partition, wherein the partition has a file and a file description block (FDB) corresponding to the file, and the partition has at least one file allocation table for storing at least one entry value corresponding to the logical addresses storing the file description block;

search an end mark among the at least one entry value according to the at least one file allocation table;

set at least one logical address storing the end mark among the logical addresses storing the at least one file allocation table as at least one default pattern address;

take at least one value stored in the at least one logical address storing the end mark as at least default value corresponding to the at least one default pattern address;

store information regarding the at least one default pattern address and the at least one default value in the physical blocks of the system area; and read the at least one default value corresponding to the at least one default pattern address from the physical blocks of the system area and transmit the at least one default value corresponding to the at least one default pattern address to the host system when receiving a read command corresponding to the at least one default pattern address from the host system.

11. The memory controller according to claim 10, wherein the procedure of reading the at least one default value corresponding to the at least one default pattern address from the physical blocks of the system area and transmitting the at least one default value corresponding to the at least one default pattern address to the host system when receiving the read command corresponding to the at least one default pattern address from the host system, which executed by the memory management circuit, comprises:

determining a value stored in the at least one default pattern address is an empty value;

transmitting the at least one default value corresponding to the at least one default pattern address to the host system when the value stored in the at least one default pattern address is the empty value; and transmitting the value stored in the at least one default pattern address to the host system when the value stored in the at least one default pattern address is not the empty value.

12. The memory controller according to claim 10, wherein the memory management circuit is further configured to:
   at least divide the logical addresses in the partition into a master boot record area, a file allocation table area and a file area;
   group the logical addresses of the master boot record area, the file, the file description block and the at least one entry value among the logical addresses into a first portion and group other logical addresses among the logical addresses into a second portion;
   determine whether the logical addresses to be written by a first write command corresponding to the logical addresses of the first portion correspond to the at least one default pattern address when receiving the first write command and at least one first data corresponding to the first write command from the host system,
   wherein the at least one first data is written into the logical addresses to be written by the first write command when the logical addresses to be written by the first write command correspond to the at least one default pattern address,
   wherein the at least one first data is not written into the logical addresses to be written by the first write command and an error message is not transmitted to the host system when the logical addresses to be written by the first write command do not correspond to the at least one default pattern address.

13. The memory controller according to claim 12, wherein the memory management circuit is further configured to:
   write at least one second data into the logical addresses to be written by a second write command corresponding to the logical addresses of the second portion when receiving the second write command and the at least one second data corresponding to the second write command from the host system.

14. The memory controller according to claim 10, wherein the memory management circuit is further configured to:
   at least divide the logical addresses in the partition into a master boot record area, a file allocation table area and a file area;
   write at least one dummy file into the physical blocks corresponding to the logical addresses; and
   group the logical addresses of the master boot record area, the file, the file description block and the at least one entry value among the logical addresses into a first portion and group the other logical addresses among the logical addresses into a second portion in unit of a sector.

15. The memory controller according to claim 10, wherein the memory management circuit is further configured to:
   at least divide the logical addresses in the partition into a master boot record area, a file allocation table area and a file area; and
   group the logical addresses of the master boot record area, the file, the file description block and the at least one entry value among the logical addresses into a first portion and group the other logical addresses among the logical addresses into a second portion in unit of a byte.

16. The memory controller according to claim 10, wherein the logical addresses storing the file among the logical addresses of the file area are continuous.

17. The memory controller according to claim 10, wherein the memory management circuit is further configured to:
   divide the logical addresses in the partition into at least a master boot record area, a file allocation table area and a file area;
   group the logical addresses of the master boot record area and logical addresses storing the file, the file description block and the at least one entry value among the logical addresses into a first portion and group other logical addresses among the logical addresses into a second portion;
   determine whether the logical addresses to be written by a first write command corresponding to the logical addresses of the first portion correspond to the at least one default pattern address when receiving the first write command and at least one first data corresponding to the first write command from the host system,
   wherein whether the at least one first data is an empty value is determined when the logical addresses to be written by the first write command correspond to the at least one default pattern address,
   wherein the at least one first data is written into the logical addresses to be written by the first write command when the at least one first data is not the empty value,
   wherein the at least one first data is not written into the logical addresses to be written by the first write command and an error message is not transmitted to the host system when the at least one first data is the empty value,
   wherein the at least one first data is not written into the logical addresses to be written by the first write command and an error message is not transmitted to the host system when the logical addresses to be written by the first write command do not correspond to the at least one default pattern address.

18. The memory controller according to claim 10, wherein each of the physical blocks has a plurality of physical pages and the physical pages belonging to the same physical block are written individually and are erased all together.

19. A memory storage system, comprising:
   a connector, configured to couple to a host system;
   a non-volatile memory module, having a plurality of physical blocks; and
   a memory controller, coupled to the non-volatile memory module and the connector and configured to:
   at least group the physical blocks into a data area, a spare area, and a system area;
   configure a plurality of logical addresses and group the logical addresses into a plurality of logical blocks for mapping to the physical blocks of the data area;
   use a file system to format the logical addresses into one partition, wherein the partition has a file and a file description block (FDB) corresponding to the file, and the partition has at least one file allocation table for storing at least one entry value corresponding to the logical addresses storing the file description block;
   set at least one logical address storing an end mark among the logical addresses storing the at least one file allocation table as at least one default pattern address;
   take at least one value stored in the at least one logical address storing the end mark as at least default value corresponding to the at least one default pattern address;
   determine whether a value stored in the at least one default pattern address is an empty value when receiving a read command corresponding to the at least one default pattern address from the host system;
   transmit the at least one default value corresponding to the at least one default pattern address to the host system when the value stored in the at least one default pattern address is the empty value; and transmit the value stored in the at least one default pattern address to the host system when the value stored in the at least one default pattern address is not the empty value.

20. The memory storage system according to claim 19, wherein the memory controller is further configured to store information regarding the at least one default pattern address and the at least one default value in the physical blocks of the system area.

21. The memory storage system according to claim 19, wherein the memory controller is further configured to:
at least divide the logical addresses in the partition into a master boot record area, a file allocation table area and a file area;
group the logical addresses of the master boot record area, the file, the file description block and the at least one entry value among the logical addresses into a first portion and group other logical addresses among the logical addresses into a second portion;
determine whether the logical addresses to be written by a first write command corresponding to the logical addresses of the first portion correspond to the at least one default pattern address when receiving the first write command and at least one first data corresponding to the first write command from the host system,
wherein the at least one first data is written into the logical addresses to be written by the first write command when the logical addresses to be written by the first write command correspond to the at least one default pattern address,
wherein the at least one first data is not written into the logical addresses to be written by the first write command and an error message is not transmitted to the host system when the logical addresses to be written by the first write command do not correspond to the at least one default pattern address.

22. The memory storage system according to claim 21, wherein when the memory controller receives a second write command corresponding to the logical addresses of the second portion and at least one second data corresponding to the second write command from the host system, the memory controller is further configured to write the at least one second data into the logical addresses to be written by the second write command.

23. The memory storage system according to claim 19, wherein the memory controller is further configured to:
at least divide the logical addresses in the partition into a master boot record area, a file allocation table area and a file area;
write at least one dummy file into the physical blocks corresponding to the logical addresses; and
group the logical addresses of the master boot record area, the file, the file description block and the at least one entry value among the logical addresses into a first portion and group the other logical addresses among the logical addresses into a second portion in unit of a sector.

24. The memory storage system according to claim 19, wherein the memory controller is further configured to:
at least divide the logical addresses in the partition into a master boot record area, a file allocation table area and a file area; and
group the logical addresses of the master boot record area, the file, the file description block and the at least one entry value among the logical addresses into a first portion and group the other logical addresses among the logical addresses into a second portion in unit of a byte.

25. The memory storage system according to claim 19, wherein the logical addresses storing the file among the logical addresses of the file area are continuous.

26. The memory storage system according to claim 19, wherein the memory controller is further configured to:
at least divide the logical addresses in the partition into a master boot record area, a file allocation table area and a file area;
group the logical addresses of the master boot record area, the file, the file description block and the at least one entry value among the logical addresses into a first portion and group other logical addresses among the logical addresses into a second portion;
determine whether the logical addresses to be written by a first write command corresponding to the logical addresses of the first portion correspond to the at least one default pattern address when receiving the first write command and at least one first data corresponding to the first write command from the host system,
wherein whether the at least one first data is an empty value is determined when the logical addresses to be written by the first write command correspond to the at least one default pattern address,
wherein the at least one first data is written into the logical addresses to be written by the first write command when the at least one first data is not the empty value,
wherein the at least one first data is not written into the logical addresses to be written by the first write command and an error message is not transmitted to the host system when the at least one first data is the empty value,
wherein the at least one first data is not written into the logical addresses to be written by the first write command and an error message is not transmitted to the host system when the logical addresses to be written by the first write command do not correspond to the at least one default pattern address.

27. The memory storage system according to claim 19, wherein each of the physical blocks has a plurality of physical pages and the physical pages belonging to the same physical block are written individually and are erased all together.

28. A non-volatile memory storage system, comprising:
a connector, configured to couple to a host system;
a non-volatile memory module, having a data area, a spare area and a system area, and the data area, the spare area and the system area respectively have a plurality of physical blocks; and
a memory controller, coupled to the connector and the non-volatile memory module and configured for configuring a plurality of logical addresses and grouping the logical addresses into a plurality of logical blocks for mapping to the physical blocks of the data area,
wherein the logical addresses are formatted into a partition and the partition at least has a file allocation table area and a directory area,
wherein the logical addresses includes a write-protect area and a writable area, wherein the file allocation table area has at least two entry values corresponding to the directory area, a first logical address storing a first entry value of the at least two entry values belongs to the write-protect area and a second logical address storing a final entry value of the at least two entry values belongs to the writeable area,
wherein the final entry value is set as an end mark corresponding to the directory area.

* * * * *